(12) United States Patent
Wengreen

(10) Patent No.: US 11,840,363 B1
(45) Date of Patent: Dec. 12, 2023

(54) DRONES THAT SAVE PEOPLE FROM DROWNING

(71) Applicant: Owen Charles Wengreen, Sammamish, WA (US)

(72) Inventor: Owen Charles Wengreen, Sammamish, WA (US)

(*) Notice: Subject to any disclaimer, the term of this patent is extended or adjusted under 35 U.S.C. 154(b) by 0 days.

(21) Appl. No.: 18/230,050

(22) Filed: Aug. 3, 2023

(51) Int. Cl.
| | |
|---|---|
| *B64U 10/14* | (2023.01) |
| *B63C 9/01* | (2006.01) |
| *B64D 1/12* | (2006.01) |
| *B64C 39/02* | (2023.01) |
| *B64U 101/57* | (2023.01) |

(52) U.S. Cl.
CPC ............... *B64U 10/14* (2023.01); *B63C 9/01* (2013.01); *B64C 39/024* (2013.01); *B64D 1/12* (2013.01); *B64U 2101/57* (2023.01)

(58) Field of Classification Search
CPC ............ B64U 10/14; B64U 2101/00; B64U 2101/55; B64U 2101/57; B64U 10/13; B64U 80/84; B63C 9/01; B63C 2009/0023; B64D 1/12; B64C 39/024
See application file for complete search history.

(56) References Cited

U.S. PATENT DOCUMENTS

| | | | |
|---|---|---|---|
| 9,745,062 B2 | 8/2017 | Richardson | |
| 9,809,307 B1* | 11/2017 | Richardson | ............ B64C 39/024 |
| 9,914,539 B1* | 3/2018 | Bar-Zeev | ............... B64C 39/024 |
| 9,944,366 B2* | 4/2018 | Tang | ....................... G16H 40/67 |
| 10,059,448 B1* | 8/2018 | Shoemaker, Jr. | .......... B63C 9/26 |
| 10,137,986 B1* | 11/2018 | Bar-Zeev | ............... B65D 81/03 |
| 10,358,196 B2 | 7/2019 | Tang | |
| 10,413,763 B2 | 9/2019 | Won | |
| 10,668,997 B2* | 6/2020 | Moses | ..................... B64U 50/19 |
| 11,267,573 B2* | 3/2022 | Wakatsuki | ............. B64D 47/08 |
| 11,524,772 B1* | 12/2022 | Cecil | ....................... B64C 25/56 |
| 11,584,526 B2* | 2/2023 | Lepek | ................... A01K 67/033 |
| 2016/0096622 A1* | 4/2016 | Richardson | .............. B64D 1/02 701/2 |
| 2016/0340006 A1* | 11/2016 | Tang | ..................... B64C 39/024 |
| 2017/0210451 A1* | 7/2017 | Oh | ............................. B64D 1/12 |
| 2018/0194445 A1* | 7/2018 | Tang | ..................... B64C 39/024 |
| 2019/0092471 A1* | 3/2019 | Lepek | ................... B64C 39/024 |

(Continued)

FOREIGN PATENT DOCUMENTS

| | | | | |
|---|---|---|---|---|
| JP | 2002037187 A | * | 2/2002 | |
| KR | 200474119 Y1 | * | 9/2014 | ............. B64C 13/20 |

(Continued)

OTHER PUBLICATIONS

Little Ripper Lifesaver Drone from Ripper Corp., downloaded on Aug. 30, 2023 from https://rippercorp.com/divisions/little-ripper-lifesaver/.

(Continued)

*Primary Examiner* — Benjamin P Lee

(57) ABSTRACT

Drowning causes many fatalities all around the world. Human rescuers are too slow, are not buoyant enough, and often fail to notice drowning victims. In contrast, drones with artificial intelligence can quickly provide drowning victims with a personal flotation device. A drone can include a compressed gas tank to inflate a personal flotation device and can deliver the personal flotation device to a person who is in danger of drowning.

21 Claims, 20 Drawing Sheets

(56) References Cited

U.S. PATENT DOCUMENTS

2020/0031438 A1    1/2020  Moses
2021/0276675 A1*  9/2021  Ökvist ...................... B63C 9/22

FOREIGN PATENT DOCUMENTS

| KR | 101522516 B1 * | 5/2015 | ............. B64C 27/08 |
| KR | 101535401 B1 * | 7/2015 | |
| WO | WO-2016159481 A1 * | 10/2016 | ............... B63C 9/01 |

OTHER PUBLICATIONS

Auxdron LFG Search and Rescue Drone, downloaded on Aug. 30, 2023 from https://dronesolutionservices.com/uav-lifejacket.

* cited by examiner

DRONES THAT SAVE PEOPLE FROM DROWNING

BACKGROUND

Field

Various embodiments disclosed herein relate to drones. Certain embodiments relate to drones that save people from drowning.

Description of Related Art

According to the United States Centers for Disease Control and Prevention, every year in the U.S. there are approximately 4,012 fatal unintentional drownings. In addition to these 4,012 deaths per year, there are approximately 8,061 nonfatal drownings that often result in long-term health problems such as brain damage. Drowning fatalities and serious injuries are even more common in many other areas of the world. Nearly all these deaths and injuries are preventable.

Drowning deaths and long-term injuries can often be prevented by providing the drowning victim with a personal flotation device. Thus, there is a need for systems and methods that can quickly and accurately provide a personal flotation device to drowning victims.

SUMMARY

In some embodiments, a drone is configured to help a drowning victim. In some embodiments, a drone comprises at least one propeller configured to enable the drone to fly and a first flotation system comprising a first chamber. The first chamber can be an inflatable chamber.

In some embodiments, a drone comprises a circular conveyor and a first tank having a gas. The circular conveyor can comprise the first flotation system and a second flotation system having a second chamber.

In some embodiments, a drone can be configured to fluidly couple the first tank to the first chamber to transfer a first portion of the gas to the first chamber to inflate the first chamber, then drop the first flotation system, then rotate the circular conveyor relative to the first tank to fluidly couple the first tank to the second chamber, then transfer a second portion of the gas to the second chamber to inflate the second chamber, and then drop the second flotation system.

In some embodiments, program instructions can be configured to fluidly couple the first tank to the first chamber to transfer a first portion of the gas to the first chamber to inflate the first chamber, then drop the first flotation system, then rotate the circular conveyor relative to the first tank to fluidly couple the first tank to the second chamber, then transfer a second portion of the gas to the second chamber to inflate the second chamber, and then drop the second flotation system.

In some embodiments, a drone comprises an actuator configured to fluidly couple the first tank to the first chamber.

In some embodiments, a drone comprises one or more tanks configured to hold a gas.

In some embodiments, a drone comprises a first tank and a second tank, a first channel configured to fluidly couple the first tank and the second tank, a first valve configured to open and close the first channel, a pressure regulator that fluidly couples the first tank and the second tank, a gas outlet, a second channel configured to fluidly couple the second tank and the gas outlet, a second valve configured to open and close the second channel, and program instructions. Program instructions can be configured to inflate the first chamber by opening the first valve while the second valve is closed to transfer a third portion of the gas to the second tank, then close the first valve, and then open the second valve while the gas outlet is fluidly coupled to the first chamber. A pressure regulator can be configured such that a second pressure inside the second tank is lower than a first pressure inside the first tank.

In some embodiments, a drone comprises a first tank having a gas, a second tank, a first channel configured to fluidly couple the first tank and the second tank, a first valve configured to open and close the first channel, a pressure regulator that fluidly couples the first tank and the second tank via the first channel, a gas outlet, a second channel configured to fluidly couple the second tank and the gas outlet, a second valve configured to open and close the second channel, and program instructions.

In some embodiments, a drone comprises at least one memory having program instructions and at least one processor configured to execute the program instructions.

In some embodiments, program instructions are configured to inflate the first chamber by opening the first valve while the second valve is closed to transfer a first portion of the gas to the second tank, then close the first valve, and then open the second valve while the gas outlet is fluidly coupled to the first chamber to transfer the first portion of the gas to the first chamber.

In some embodiments, a drone comprises a second flotation system having a second chamber. Program instructions can be configured to inflate the first chamber and then inflate the second chamber by fluidity coupling the gas outlet to the second chamber, opening the first valve while the second valve is closed to transfer a second portion of the gas to the second tank, and opening the second valve while the first valve is closed and while the gas outlet is fluidly coupled to the second chamber.

In some embodiments, a drone comprises a second flotation system having a second chamber configured to be inflated with a gas, a first housing coupled to the at least one propeller, and a second housing rotatably coupled to the first housing. The second housing can comprise a first cavity and a second cavity. The first flotation system can be located at least partially in the first cavity. The second flotation system can be located at least partially in the second cavity.

In some embodiments, a drone comprises a first tank having a gas. A drone can be configured to fluidly couple the first tank to the first chamber to inflate the first chamber and then rotate the second housing relative to the first housing to fluidly couple the first tank to the second chamber to inflate the second chamber.

In some embodiments, program instructions are configured to fluidly couple the first tank to the first chamber to inflate the first chamber and then rotate the second housing relative to the first housing to fluidly couple the first tank to the second chamber to inflate the second chamber.

In some embodiments, a drone comprises a first tank having a gas. A drone can be configured to inflate the first chamber by fluidly coupling the first tank to the first chamber and then inflate the second chamber by rotating the second housing relative to the first housing and then fluidly coupling the first tank to the second chamber.

In some embodiments, program instructions are configured to inflate the first chamber by fluidly coupling the first tank to the first chamber and then inflate the second chamber by rotating the second housing relative to the first housing and then fluidly coupling the first tank to the second chamber.

In some embodiments, a drone comprises a first tank having a gas, a first motor configured to rotate the second housing relative to the first housing, and a linear actuator. The linear actuator can comprise a first portion and a second portion configured to move away from the first portion.

In some embodiments, the linear actuator is configured to move the second portion relative to the first portion to fluidly couple the first tank to the first chamber to inflate the first chamber, the first motor is configured to rotate the second housing relative to the first housing to enable fluidly coupling the first tank to the second chamber, and the linear actuator is configured to move the second portion relative to the first portion to fluidly couple the first tank to the second chamber to inflate the second chamber.

In some embodiments, the linear actuator and the program instructions are configured to move the second portion relative to the first portion to fluidly couple the first tank to the first chamber to inflate the first chamber, the first motor and the program instructions are configured to rotate the second housing relative to the first housing to enable fluidly coupling the first tank to the second chamber, and the linear actuator and the program instructions are configured to move the second portion relative to the first portion to fluidly couple the first tank to the second chamber to inflate the second chamber.

In some embodiments, a drone comprises program instructions and a first tank having a gas. Program instructions can be configured to fluidly couple the first tank to the first chamber to transfer a first portion of the gas to the first chamber to inflate the first chamber, then drop the first flotation system, then rotate the second housing relative to the first housing to fluidly couple the first tank to the second chamber, then transfer a second portion of the gas to the second chamber to inflate the second chamber, and then drop the second flotation system.

In some embodiments, a drone comprises a gas outlet configured to be fluidly coupled with the first tank, a first motor configured to rotate the second housing relative to the first housing, and a linear actuator. The linear actuator can comprise a first portion and a second portion configured to move away from the first portion. Program instructions can be configured to move the second portion away from the first portion of the linear actuator to fluidly couple the gas outlet to the first chamber to inflate the first chamber, then rotate the second housing relative to the first housing to bring the second chamber closer to the gas outlet, and then move the second portion away from the first portion of the linear actuator to fluidly couple the gas outlet to the second chamber to inflate the second chamber.

In some embodiments, a drone comprises a first electromagnet. The linear actuator can be configured such that supplying a first electric current through the first electromagnet pushes the second portion away from the first portion.

In some embodiments, a drone comprises a first housing coupled to the at least one propeller and a second housing coupled to the first housing. The second housing can comprise a first cavity. The first flotation system can comprise a first bladder having the first chamber. The first bladder can comprise an accordion-shaped portion configured to expand when inflated. The accordion-shaped portion can be located at least partially in the first cavity.

In some embodiments, a drone comprises a membrane. The first cavity can comprise a distal end portion at least partially blocked by the membrane such that the membrane is configured to prevent the first flotation system from falling out of the first cavity and the membrane is configured to be ruptured when the accordion-shaped portion is inflated to enable the first flotation system to exit the distal end portion.

In some embodiments, a drone comprises a first housing coupled to the at least one propeller and a second housing coupled to the first housing. The second housing can comprise a first cavity. At least a portion of the first chamber can be located in the first cavity, In some embodiments, a first flotation system comprises an inlet coupled to the first cavity and a tube having a lumen that fluidly couples the first chamber and the inlet. The drone can be configured to inflate the first chamber such that the first chamber exits the first cavity while the inlet remains coupled to the first cavity and while the tube couples the inlet to the first chamber.

In some embodiments, a first flotation system comprises a first bladder having the first chamber. The tube can be at least one meter long and/or at least three meters long. Program instructions can be configured to drag the first bladder on a surface of a body of water while the inlet is coupled to the first cavity such that the tube pulls the first bladder along the surface of the body of the water.

In some embodiments, a drone comprises a first tank having a gas, program instructions, and a linear actuator. The linear actuator can comprise a first portion and a second portion. The second portion of the linear actuator can be configured to move away from the first portion of the linear actuator. Program instructions can be configured to move the second portion away from the first portion a first distance to fluidly couple the first tank to the inlet to cause the first chamber to exit the first cavity by inflating the first chamber, and the program instructions can be configured to move the second portion away from the first portion a second distance that is greater than the first distance to decouple the first flotation system from the drone.

In some embodiments, a drone comprises a first cavity, a first tank having a gas, an actuator, which can be a linear actuator, and an inlet fluidly coupled to the first chamber. The first flotation system can be located at least partially in the first cavity. The actuator can comprise a first portion and a second portion. The second portion can be configured to move away from the first portion to fluidly couple the first tank to the inlet to transfer a first portion of the gas from the first tank to the first chamber to inflate the first flotation system.

In some embodiments, a drone comprises a first electromagnet. The actuator can be configured such that supplying a first electric current through the first electromagnet pushes the second portion away from the first portion to fluidly couple the first tank to the inlet.

In some embodiments, a drone comprises a first electromagnet and a second electromagnet. The actuator can be a linear actuator configured to push the second portion away from the first portion in a first direction. The first electromagnet and the second electromagnet can be located radially outward from the first direction. The first electromagnet and the second electromagnet can be configured such that supplying a first electric current through the first electromagnet and supplying a second electric current through the second electromagnet causes the first electromagnet to repel the second electromagnet to push the second portion away from the first portion to fluidly couple the first tank to the inlet.

In some embodiments, a drone comprises a housing coupled to the at least one propeller, a tube that is at least one meter long and that has a lumen that fluidly couples the first chamber and the inlet, and a disk that removably couples the inlet to the housing.

In some embodiments, a drone is configured such that supplying the first electric current through the first electromagnet and supplying the second electric current through the second electromagnet fluidly couples the first tank to the inlet when a channel between the first tank and the inlet is open, inflating the first chamber causes the first chamber to exit the first cavity while the tube couples the first chamber to the disk while the disk couples the inlet to the housing, and supplying at least one of a third electric current through the first electromagnet and a fourth electric current through the second electromagnet dislodges the disk (to force the disk out of a secure or settled position) such that the inlet is uncoupled from the housing to enable the first flotation system to fall away from the drone. The third electric current can be greater than the first electric current. The fourth electric current can be greater than the second electric current.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
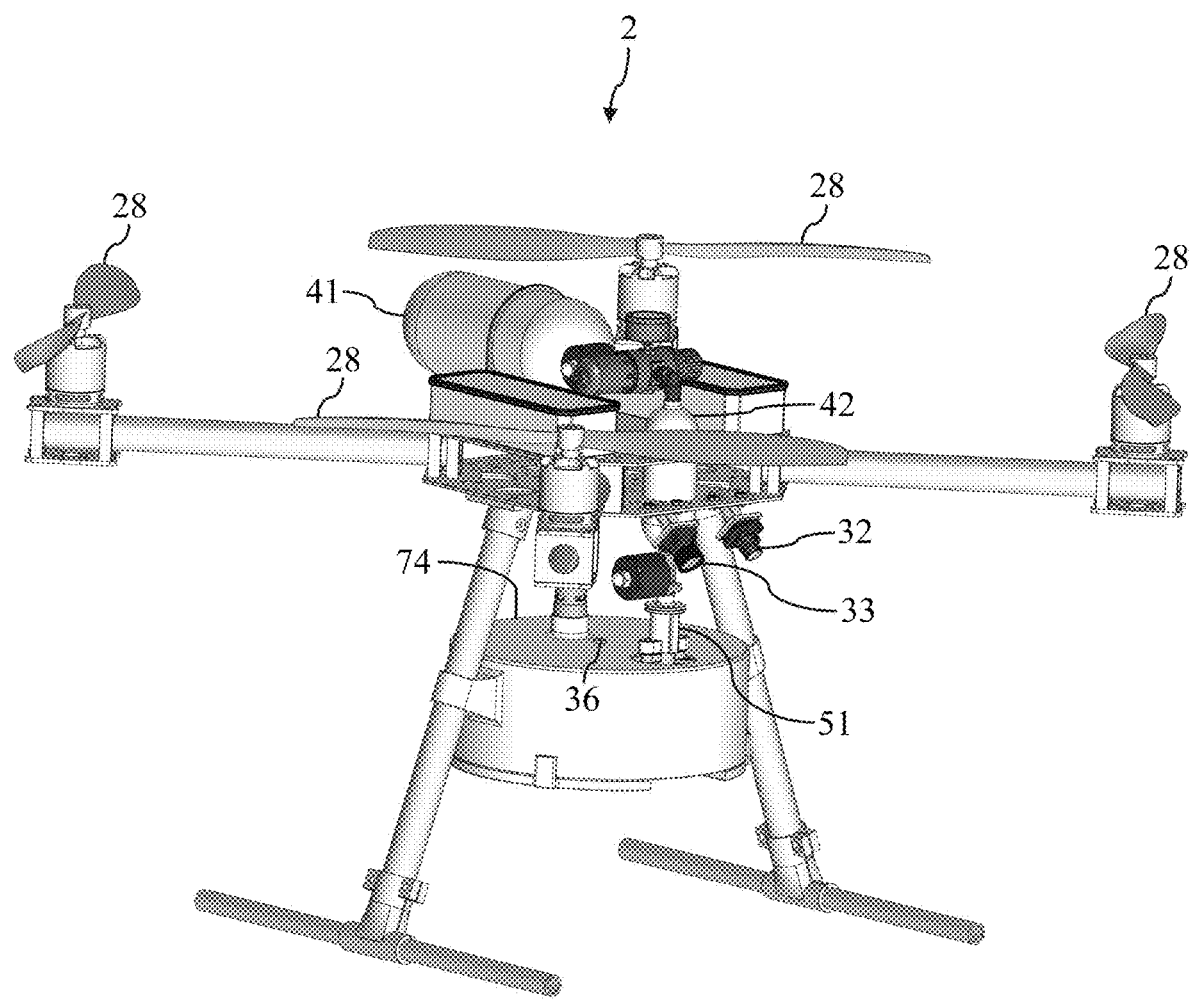
FIG. 1 illustrates a perspective view of a drone, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Many embodiments described herein will save lives by quickly and accurately providing drowning victims with a personal flotation device. According to the United States Centers for Disease Control and Prevention, every year in the U.S. there are approximately 4,012 fatal unintentional drownings. In addition to these 4,012 deaths per year, there are approximately 8,061 nonfatal drownings that often result in long-term health problems such as brain damage. Drowning fatalities and serious injuries are even more common in many other areas of the world. Many of these deaths and injuries can be prevented by the drone 2 shown in FIGS. 1 to 19. The drone 2 is designed to quickly and accurately deliver a flotation system to drowning victims. The drone 2 is particularly effective in large bodies of water where the time necessary for a human swimmer to reach the victim is too great to guarantee the survival of the drowning victim.

In addition, people who witness a person drowning may swim over to drowning victims only to become drowning victims themselves. Retrospective analyses have shown that when a person is drowning, their instinct is to climb onto the rescuer. The rescuer, however, typically has very little buoyancy and is often easily pushed under the water by the drowning victim, which too often results in the deaths of both the original drowning victim and the person who attempted the rescue. As a result, it is very dangerous for a nearby swimmer to attempt to rescue a drowning victim.

In contrast, the drone 2 can fly to the drowning victim far faster than any human swimmer. Moreover, the drone 2 can drop a flotation system down to the drowning victim without endangering anyone. The buoyancy of the flotation system easily enables drowning victims to keep their heads above the water.

The flotation system is designed to support the weight of at least two people to ensure that a drowning victim and a rescuer can stay afloat with a single flotation system.

In some cases, there is more than one drowning victim. In other cases, the drone 2 drops a flotation system to a drowning victim but wind, waves, or other circumstances prevent the flotation system from reaching the drowning victim. The drone 2 successfully handles these challenging cases by employing a rotating conveyor 34 that enables one inflation system to inflate multiple flotation systems 30a, 30b, 30c, 30d, 30e.

Artificial Intelligence ("AI") can significantly aid in the operation of a flying drone 2 to find a drowning victim, through a combination of various technologies including computer vision, machine learning, and navigation algorithms. In some embodiments, a drone system 1 and/or a drone 2 operates completely autonomously (without the aid of people). In some embodiments, AI provides helpful abilities, but people are still involved in some of the decision making of the drone system 1 and/or the drone 2. Some drone systems 1 include multiple drones 2 that can work together (e.g., to save many drowning victims when a ship sinks and/or to search a large area).

The drone 2 can include a camera 32, which can be configured to capture visible light. The drone 2 can include a thermal camera 33 configured for thermal imaging. The thermal camera 33 can capture infrared light.

Computer vision helps the AI to interpret and understand visual data from the drone's 2 camera feed. Algorithms can be trained to recognize different objects in the water, including distinguishing between different water conditions, debris, and people. With this capability, the AI can quickly identify a person in the water who may be drowning. This becomes particularly useful in conditions where human vision might be impaired, such as at night or in choppy water conditions.

AI can learn from past data and make predictions about new data. In the context of search and rescue operations using the drone 2, machine learning algorithms are trained on data such as human body shapes, swimming patterns, and drowning behavior, among other relevant factors. The machine learning algorithms can predict the likelihood of a person's presence at a particular location and guide the drone 2 to investigate further. A video feed to a person located remotely can enable a person (such as a lifeguard or a person at a remote computer terminal) to determine if the video feed shows a person who needs a flotation system 30a. If this remote person determines that the video feed shows a person who needs a flotation system 30a, the drone system 1 can then autonomously deliver the flotation system 30a, confirm whether the drowning victim 3a is using the flotation system 30a to stay afloat, and if needed, deliver additional flotation systems 30b, 30c to the drowning victim 3a until the drowning victim 3a is able to grasp one of the flotation systems 30a, 30b, 30c.

The drone 2 is equipped with a thermal camera 33 that can detect heat. Using AI, these thermal images can be analyzed by the drone system 1 to identify the heat signature of a human body (in contrast to the surrounding water 26 temperature), even in difficult lighting or visibility conditions.

The AI can also use historical data and predictive analysis to determine where a drowning victim 3a might be. By taking into account the water current, wind direction, the time that has elapsed since the person was reported drowning, and other relevant data, AI can predict potential locations of the drowning victim 3a.

The AI can control the drone's 2 flight, enabling it to navigate autonomously. This includes avoiding obstacles, maintaining a stable hover, and moving in patterns that maximize search efficiency. The AI can also adjust these patterns based on real-time data, such as changes in weather or light conditions.

After identifying a potential drowning victim 3a, the drone 2 can relay the location data in real time to the rescue team, ensuring immediate response. The AI can also annotate and highlight important visual information in the video feed, making it easier for human operators to understand the situation.

It's worth noting that while AI can dramatically aid in this process, in some cases, human oversight can still be beneficial to confirm findings and make critical decisions. The AI can help make the search process quicker and more efficient, but in some cases, the rescue operation's ultimate success might still depend on the skill and experience of the rescue team. (Future AI developments will likely reduce or even eliminate the need for human oversight or involvement.)

The mission of the drone system 1 is to save the drowning victim 3a before the drowning victim 3a has permanent injuries or passes away. (As used herein, a "drowning victim" can still be alive. A drowning victim is a person who might be in danger of drowning and/or who might be struggling to keep their head above the surface of the water.)

Figure 16:
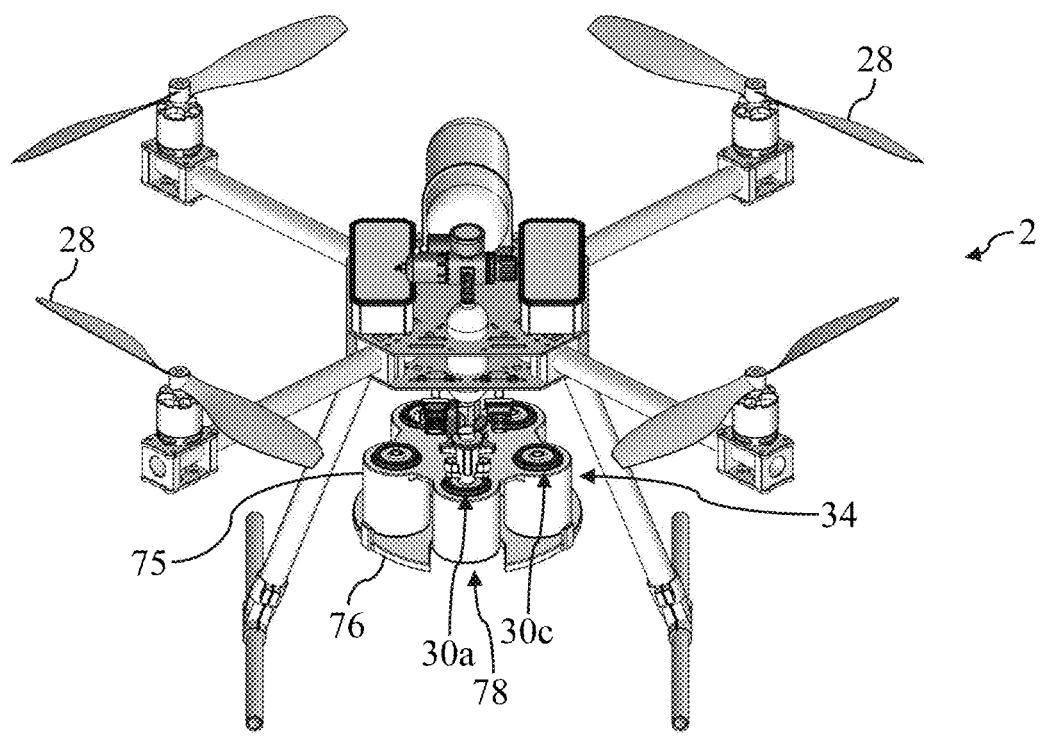
FIGS. 16-18 illustrate perspective views of a drone with an upper part of a housing hidden, according to some embodiments.

FIG. 16 illustrates a first flotation system 30a aligned with an inflation system and ready to drop down through an opening 78 to reach the water below the drone 2. After inflating and dropping the first flotation system 30a, the conveyor 34 rotates (e.g., as shown by an arrow 37 in FIG. 13) to bring another flotation system 30c into position to be inflated and dropped down through the opening 78.

Figure 17:
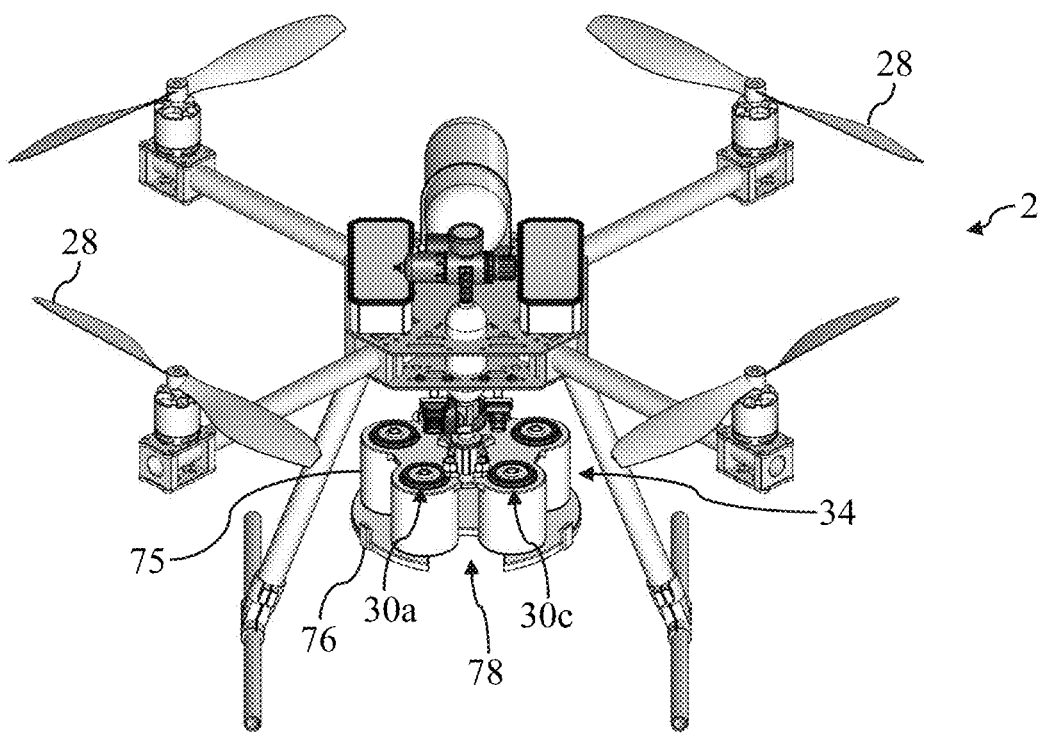

As mentioned above, FIG. 16 illustrates the first flotation system 30a aligned with the opening 78. FIG. 17 illustrates the conveyor 34 after it has started to rotate to bring another flotation system 30c into position to be inflated and dropped down through the opening 78. FIG. illustrates the conveyor 34 after it has finished rotating sufficiently to align the other flotation system 30c with the inflation system and the opening 78 such that the other flotation system 30c is ready to be inflated and then dropped downward to a drowning victim located below the drone 2.

The figures illustrate several housings with can include but are not limited to housings 74, 75. In some embodiments, a "first" housing is housing 74. In some embodiments, a "first" housing is housing 75. In some embodiments, a "second" housing is housing 75.

Figure 8:
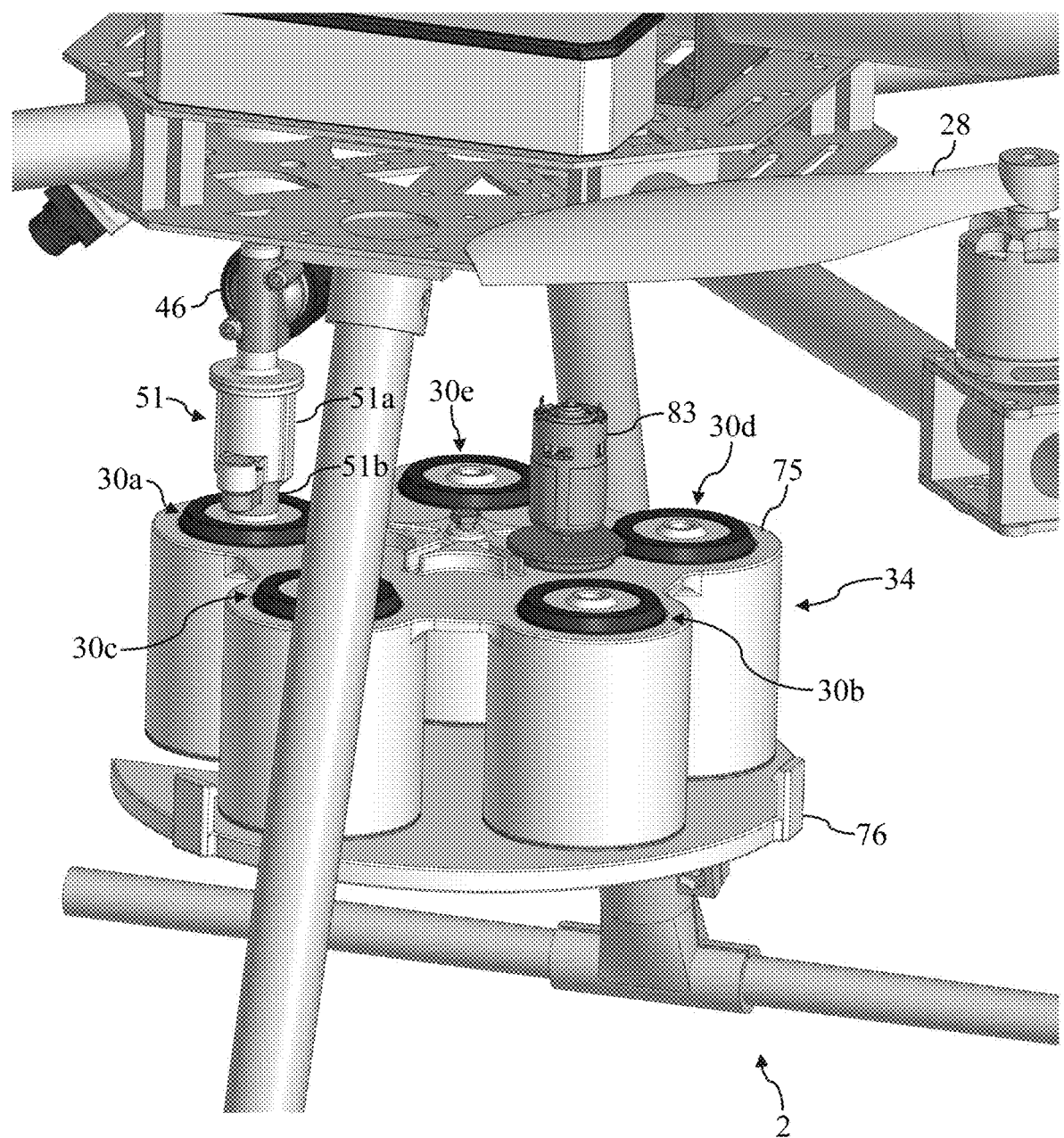
FIG. 8 illustrates a perspective view of portions of a drone with an upper part of a housing hidden, according to some embodiments.
Figure 9:
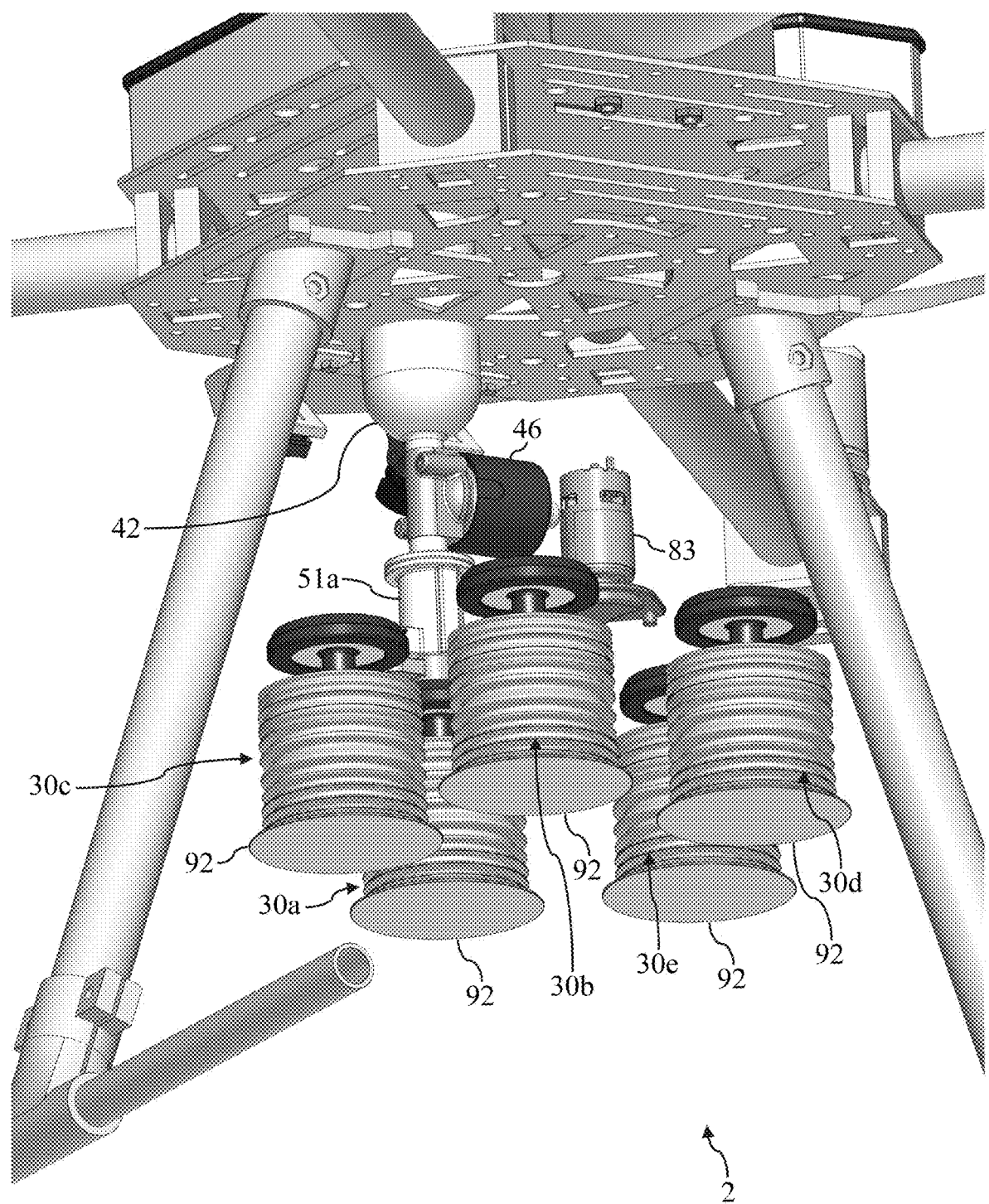
FIG. 9 illustrates a perspective view of portions of a drone with some housing components hidden, according to some embodiments.
Figure 10:
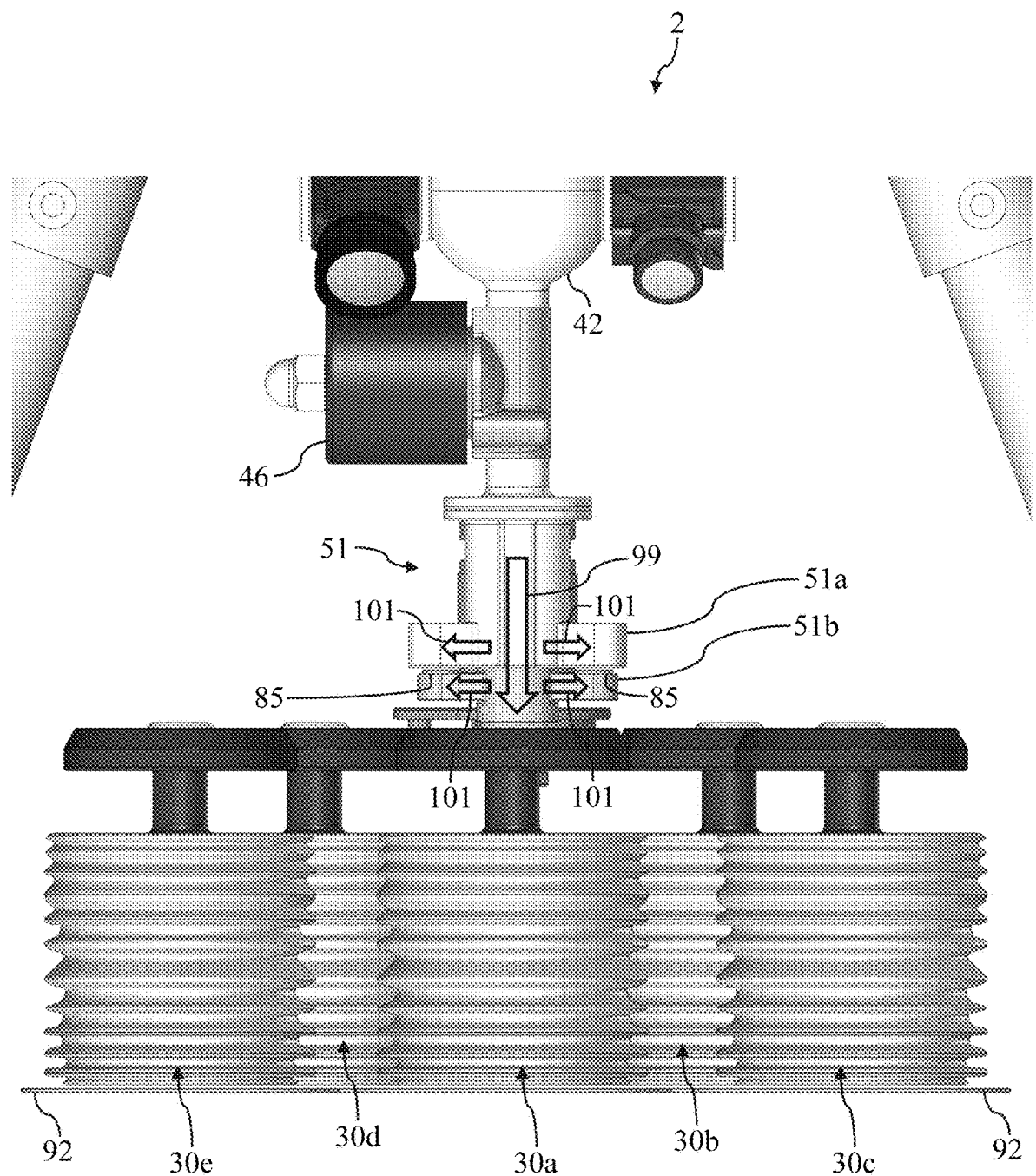
FIG. 10 illustrates a front view of portions of a drone with some housing components hidden, according to some embodiments.
Figure 11:
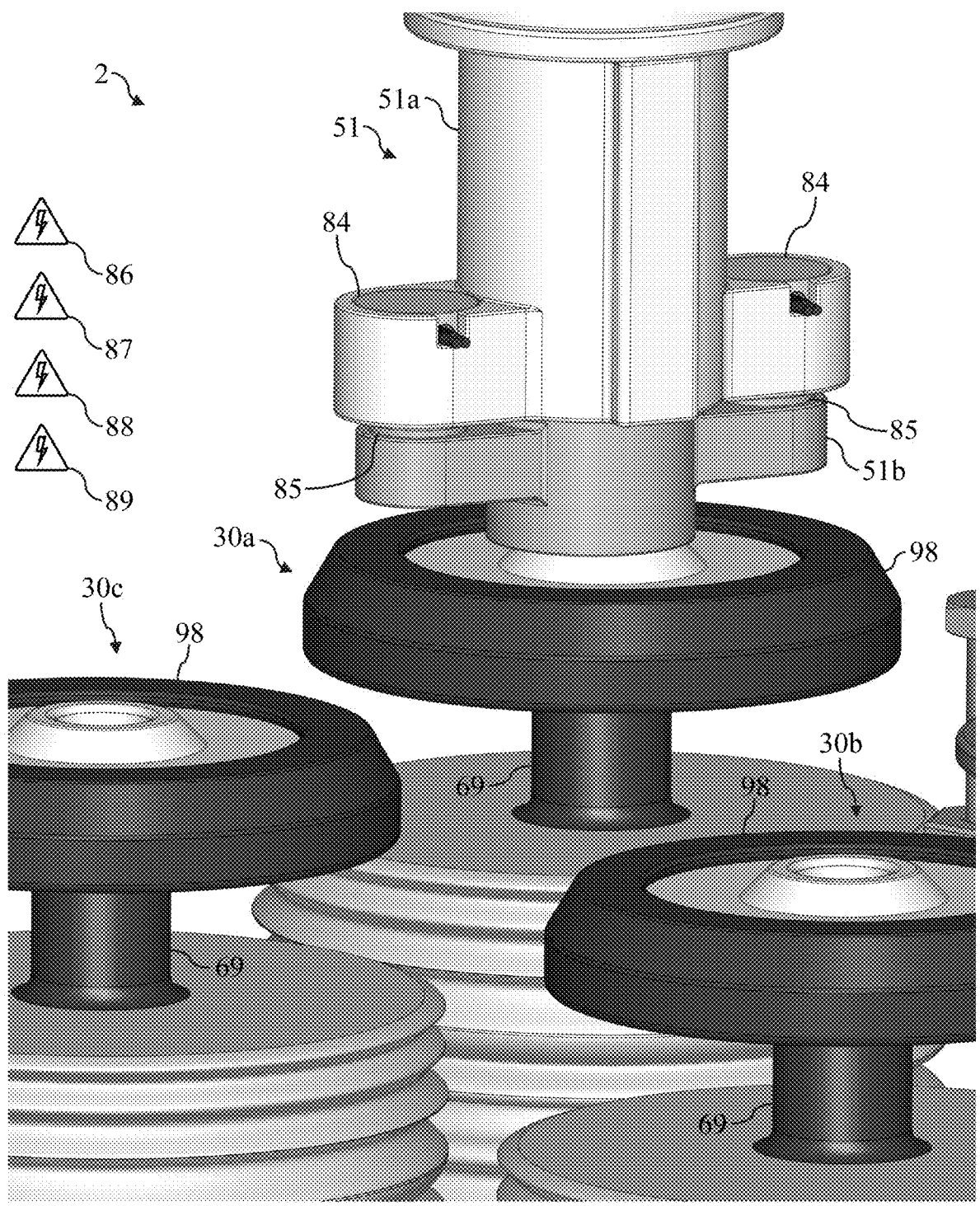
FIG. 11 illustrates a perspective view of portions of a drone with some housing components hidden, according to some embodiments.
Figure 12:
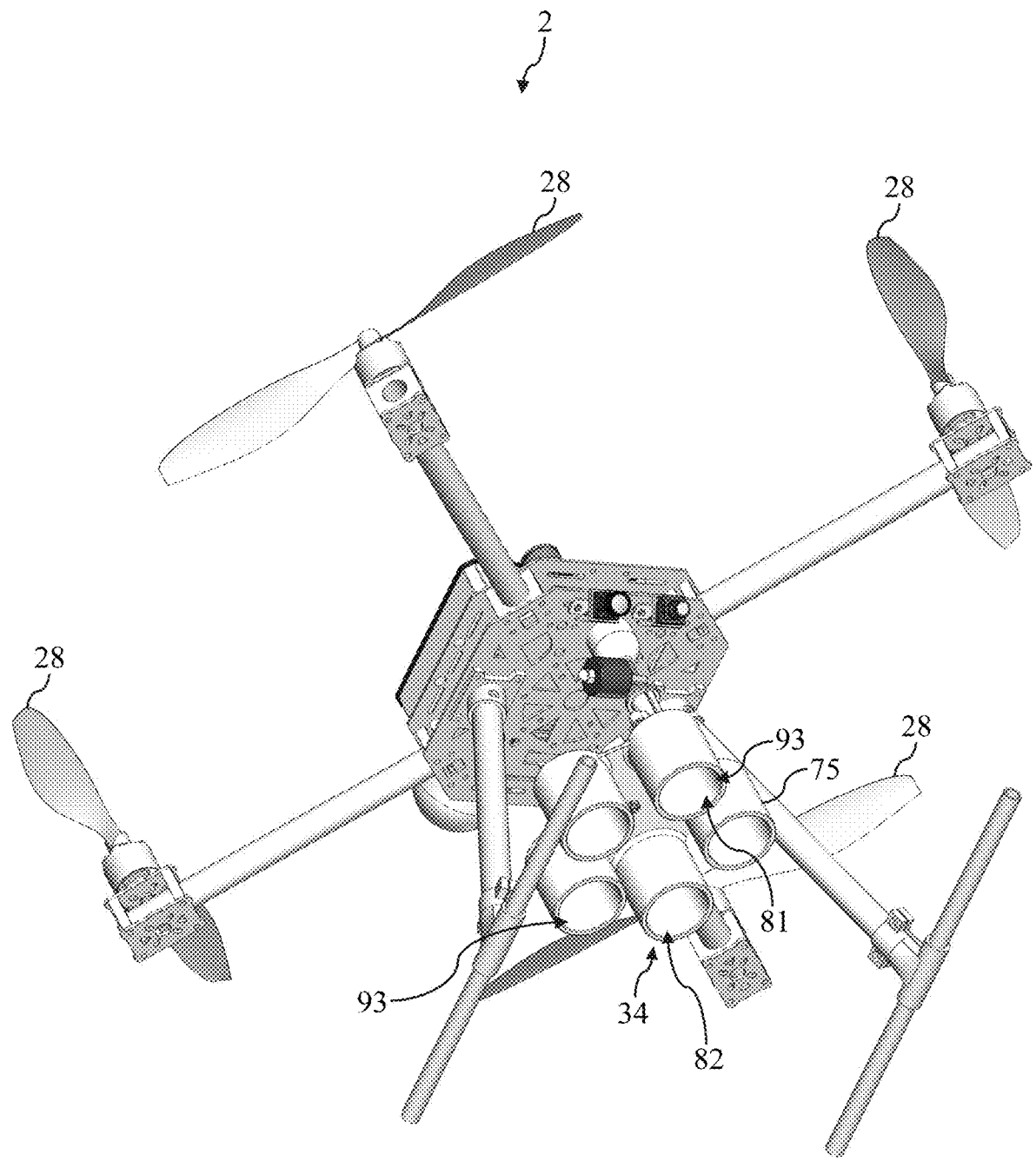
FIG. 12 illustrates a perspective view of a drone (with some housing components hidden) after flotation systems are deployed, according to some embodiments.
Figure 13:
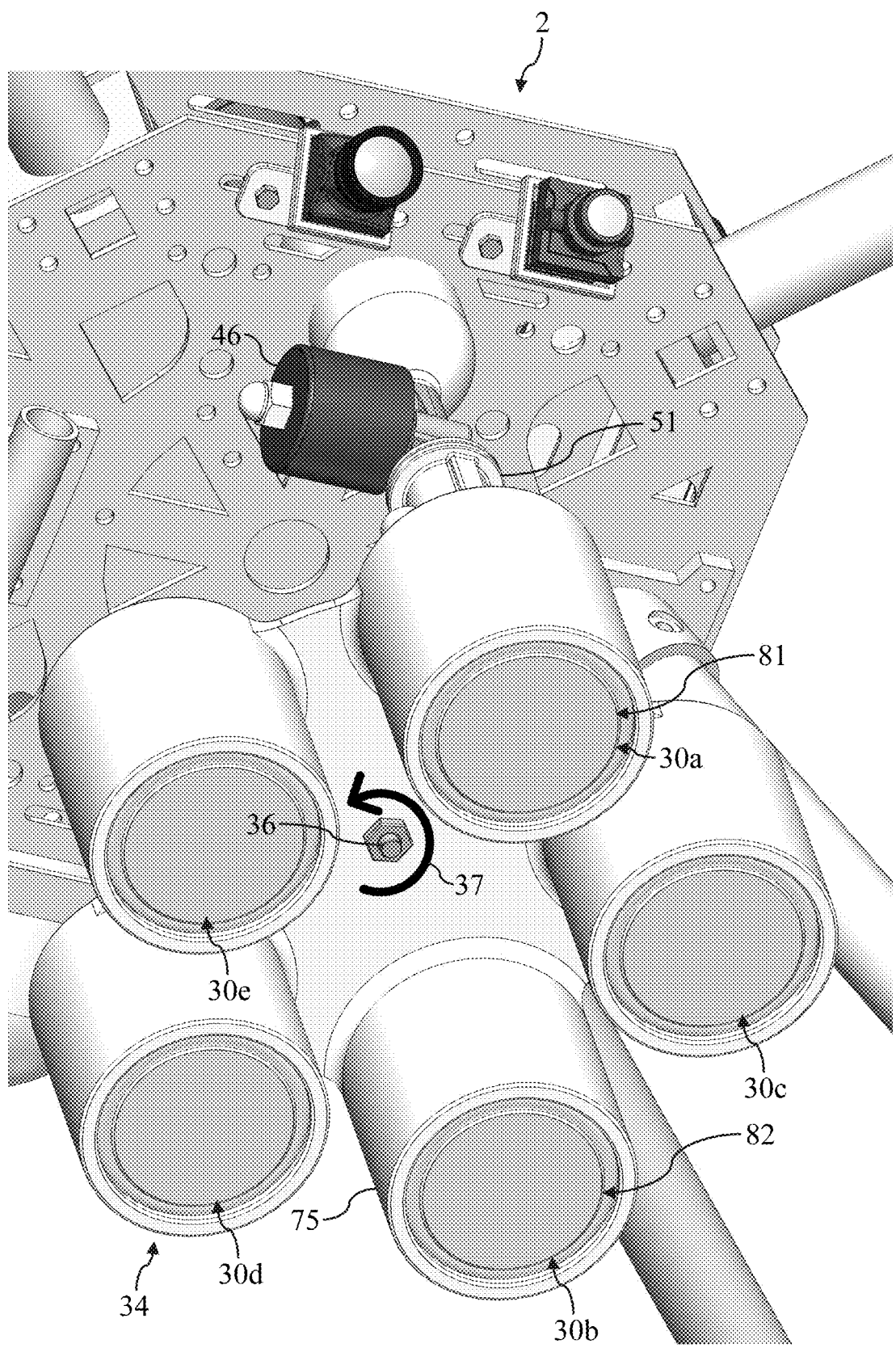
FIG. 13 illustrates a perspective view of portions of a drone (with some housing components hidden and membranes hidden) before flotation systems are deployed, according to some embodiments.
Figure 14:
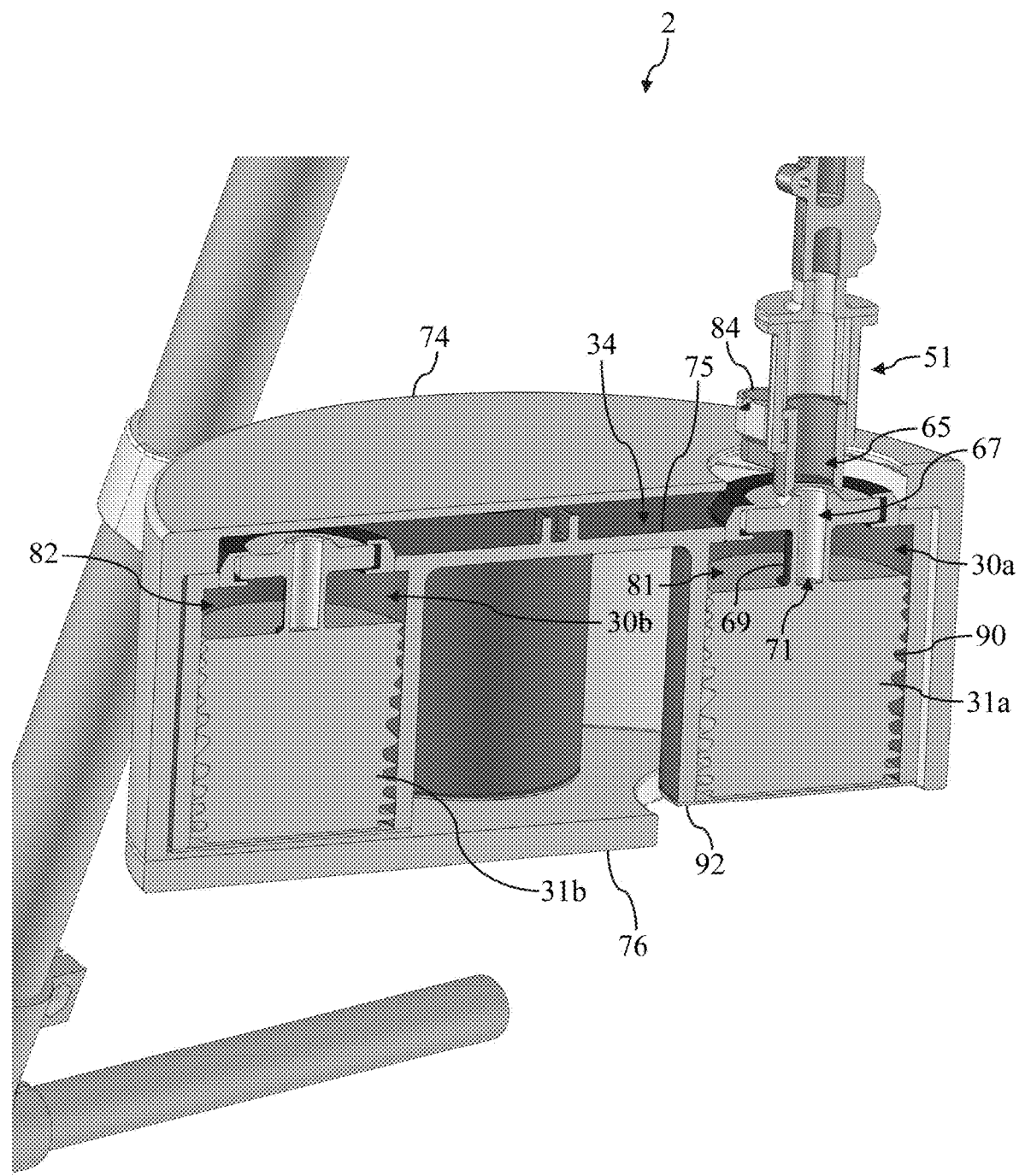
FIGS. 14 and 15 illustrate cross-sectional, perspective views of portions of a drone, according to some embodiments.
Figure 18:
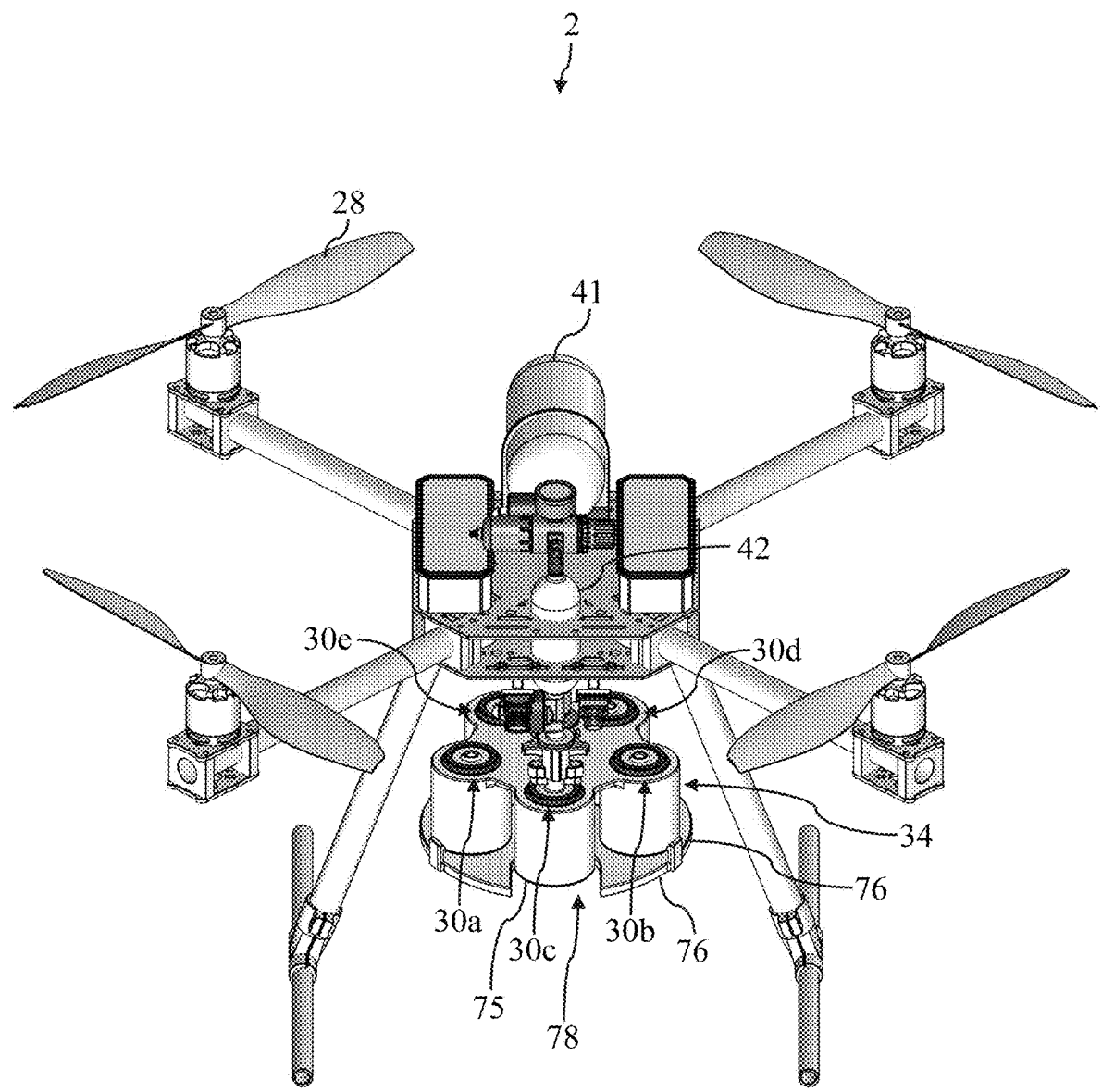

To enable better viewing of particular features, some elements are hidden in some figures. In FIG. 8, an upper portion of housing 74 is hidden (but the lid 76 is not hidden). In FIGS. 9 to 11, housing 74 (including the lid 76) and housing 75 are hidden. In FIGS. 12 and 13, housing 74 (including the lid 76) is hidden. In FIGS. 16 to 18, an upper portion of housing 74 is hidden (but the lid 76 is not hidden).

To increase the clarity of particular features in each figure, not all features are labeled in every figure.

Figure 19:
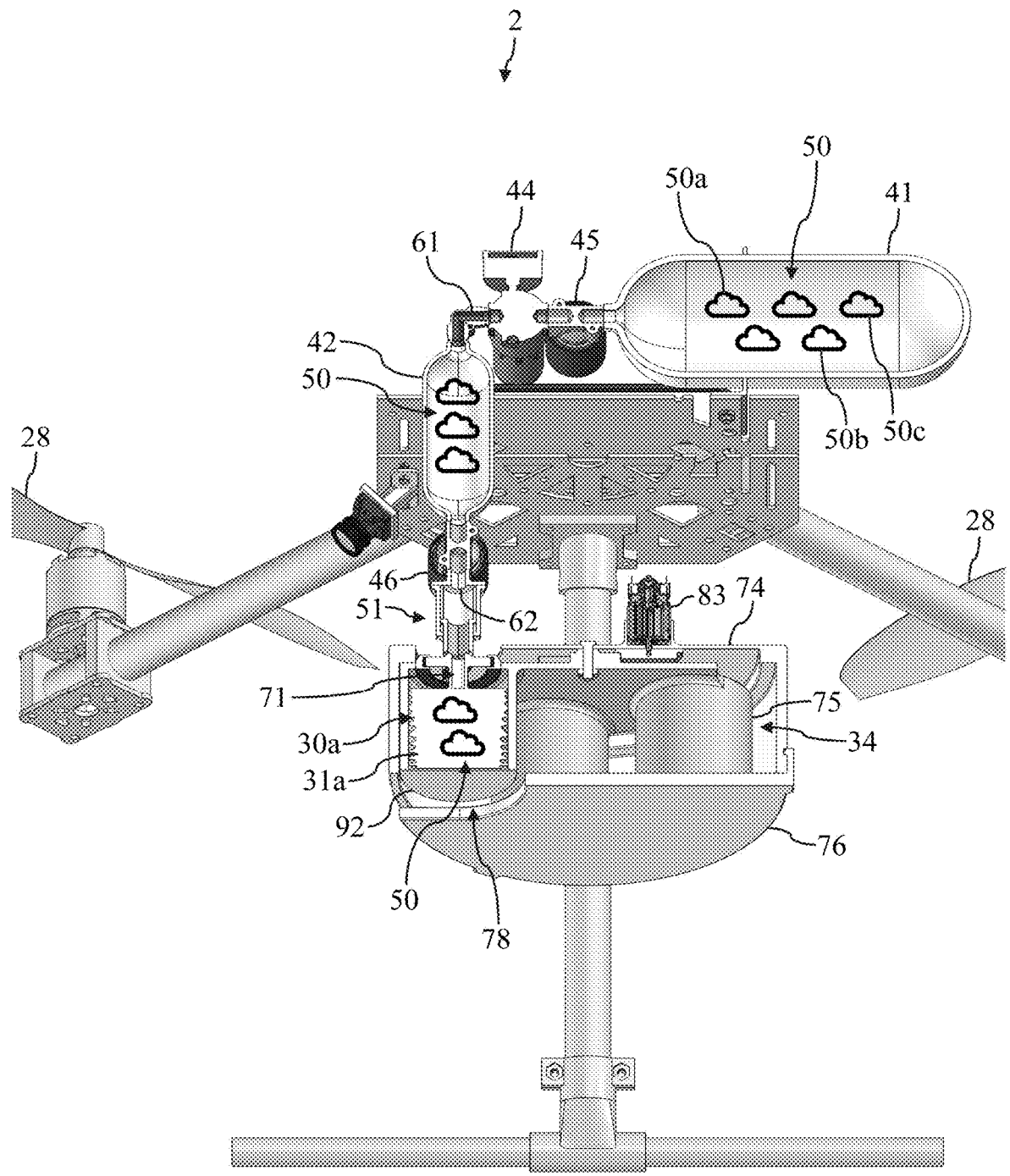
FIG. 19 illustrates a cross-sectional, perspective view of portions of a drone, according to some embodiments.
Figure 20:
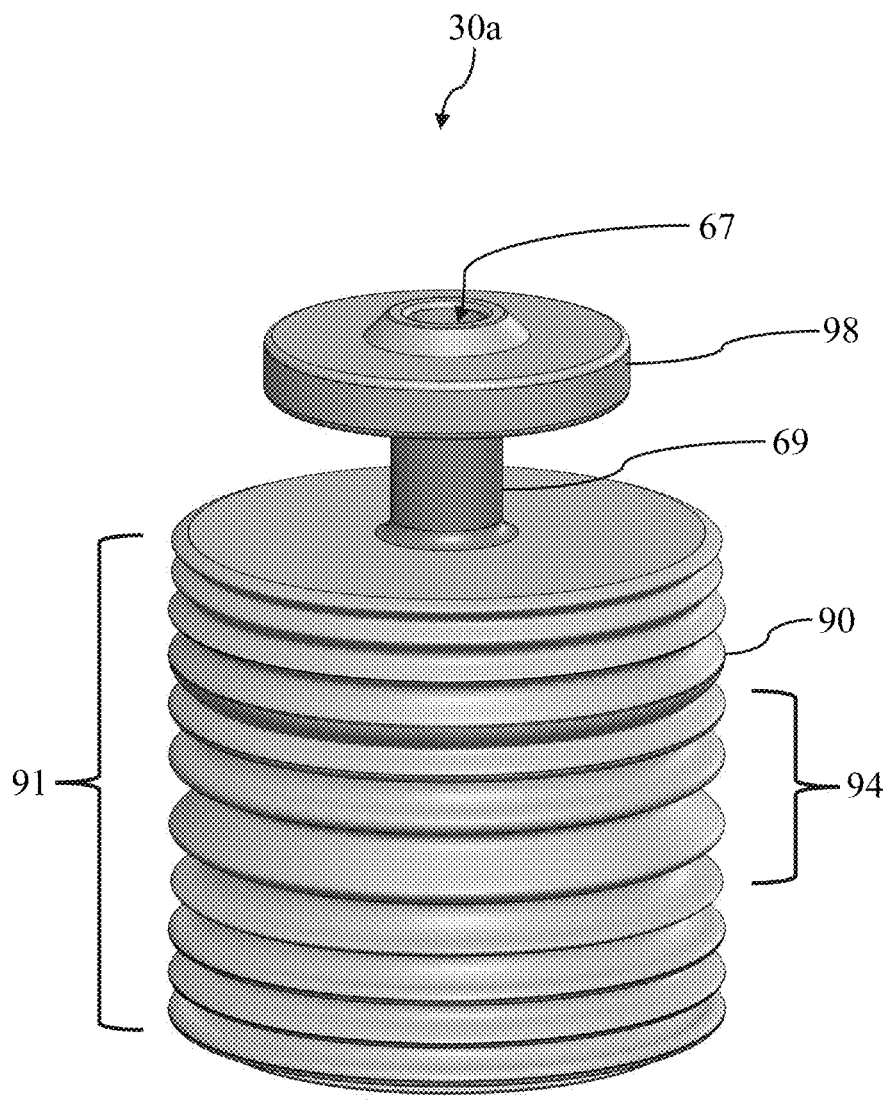
FIG. 20 illustrates a perspective view of a flotation system, according to some embodiments.
Figure 21:
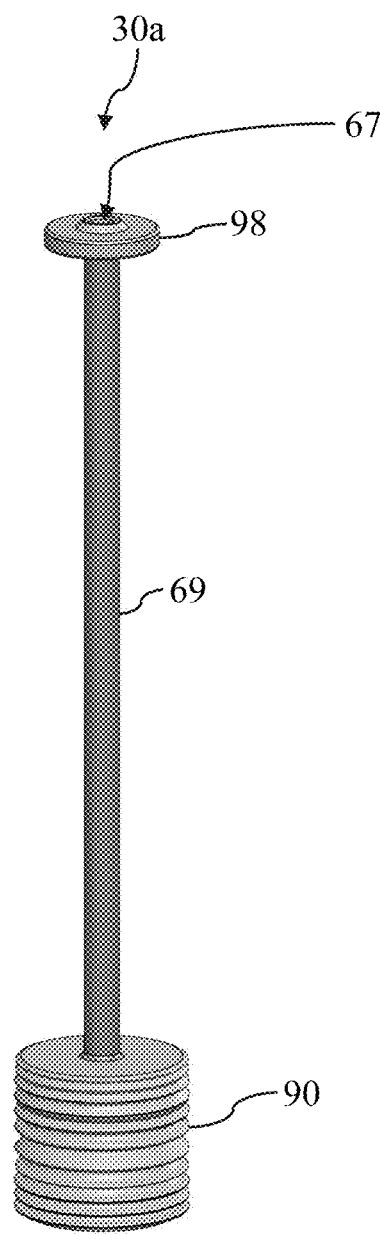
FIG. 21 illustrates a perspective view of a flotation system with an elongated tube, according to some embodiments.

FIG. 19 illustrates a flotation system 30a that includes a short tube 69. FIG. 20 illustrates a flotation system 30a that includes a longer tube 69. To avoid filling areas inside a housing 75 (e.g., cavities 81, 82) with such a long tube 69 that the tube 69 blocks the view of other features, the tube 69 is shown with a short length in many of the figures. In some embodiments, the tube 69 is very short. In other embodiments, the tube 69 is very long. In some embodiments, the tube 69 is at least one meter, at least three meters, longer than three meters, and/or less than ten meters. The tube 69 can be wrapped neatly inside cavities 81, 82 to enable a relatively small cavity to hold a long tube 69.

Figure 2:
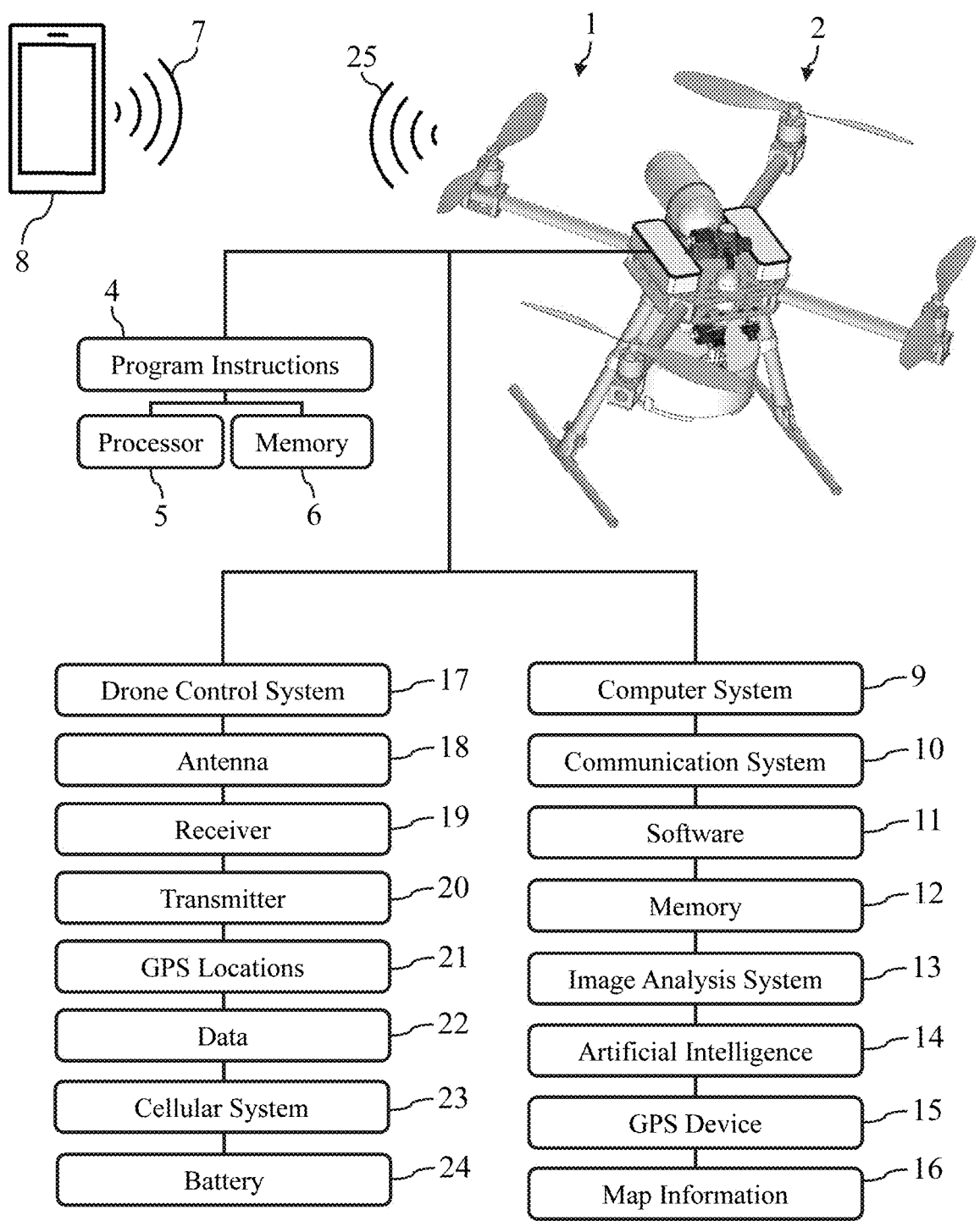
FIG. 2 illustrates a diagrammatic view of a drone system, according to some embodiments.
Figure 2:
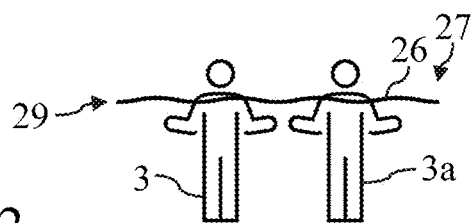

FIG. 1 illustrates a perspective view of a drone 2 configured to save people 3 from drowning in water 26. FIG. 2 illustrates a diagrammatic view. The drone 2 can be part of a drone system 1 that includes program instructions 4, processors 5, memories 6, a drone 2 control system 17, an antenna 18, a receiver 19, a transmitter 20, Global Positioning System ("GPS") locations 21, GPS devices 15, data 22, cellular communication systems 23, batteries 24, computer systems 9, communication systems 10, software 11, additional memory 12, image analysis systems 13, artificial intelligence systems 14, and map information 16. The antenna 18 can be configured to receive cellular, radio, Bluetooth, and satellite communications. The transmitter 20 can include a radio transmitter, a Bluetooth transmitter, a cellular transmitter, and a satellite transmitter. The drone 2 can include a microphone and speaker to communicate with the drowning victim 3a.

A remote computing device 8 can send wireless communications 7 to the drone system 1 and can receive wireless communications 25 from the drone 2 (and/or drone system 1) to enable remote control of the drone system 2 and to receive information from the drone 2. A lifeguard, any other person, or an artificial intelligence entity can use the remote computing device 8 to fly the drone 2.

Any of the features described for the drone system 1 can be physically coupled to the drone 2 such that the features are part of the drone 2. In some embodiments, features of the drone system 1 are located remotely relative to the drone 2 and are not physically coupled to the drone 2.

In some embodiments, a drone 2 is configured to help a drowning victim 3a (who can be one of the people 3 in the water 26). In some embodiments, a drone 2 comprises at least one propeller 28 configured to enable the drone 2 to fly and a first flotation system 30a comprising a first chamber 31a. The first chamber 31a can be an inflatable chamber that can be packed into a small area and then inflated to a much larger volume than the volume of the small area.

Some embodiments include a second flotation system 30b, a third flotation system 30c, a fourth flotation system 30d, a fifth flotation system 30e, and additional flotation systems. The drone 2 can be configured to drop a first flotation system 30a to a first person who is in danger of drowning at a first location, fly to a second location, drop a second flotation system 30b to a second person who is in danger of drowning at the second location, fly to a third location, drop a third flotation system 30c to a third person who is in danger of drowning at the third location, and then continuing flying to additional locations to drop a flotation system at each of the additional locations to save people who are in danger of drowning at many locations.

In some cases, the drone 2 will attempt to drop a flotation system to a person who is in danger of drowning, but due to wind, waves, and many other potential factors, the person will not be able to reach the flotation system. In these cases, the drone 2 can drop additional flotation systems until the person is able to reach one of the flotation systems.

Each of the flotation systems 30b, 30c, 30d, 30e can include any of the features described in the context of the first flotation system 30a.

Some embodiments comprise a circular conveyor 34 that rotates (relative to other parts of the drone 2) about a bolt 36 as indicated by the arrow 37 shown in FIG. 13. This rotation can enable one pressurized gas 50 source to fill many flotation systems.

As used herein, "circular" means that the shape forms a loop shape that may be an open loop or a closed loop. The circular conveyor 34 is "circular" because the conveyor moves flotation systems in a loop.

Some embodiments comprise one or more tanks 41, 42 configured to hold a gas 50 such as carbon dioxide, hydrogen, air, or any other suitable gas 50. The tanks 41, 42 can be configured to hold pressurized gas 50.

In some embodiments, a "first tank" refers to tank 41 and a "second tank" refers to tank 42. In some embodiments, tank 42 is the "first tank."

Not all embodiments comprise a "second tank." For example, some embodiments comprise a first tank 41 but do not comprise a second tank 42 and do not comprise some of the other components shown in the figures (e.g., regulators, valves).

Tank 41 can comprise a volume that is much larger than the volume of tank 42. The volume of tank 41 can be sufficient to fill many flotation systems. The volume of tank 42 can be optimized to fill one flotation system.

A pressure regulator 44 can be used to provide an output pressure to the second tank 42 that is less than an input pressure from the first tank 41. This enables a relatively small tank 41 to hold a sufficient quantity of gas 50 to fill many flotation systems without providing a high pressure to the flotation systems that would rupture their inflatable chambers. In some embodiments, flotation systems are filled with gas 50 to a pressure of 4 psi.

In some embodiments, a drone 2 comprises a circular conveyor 34 and a first tank 41 having a gas 50. The gases used in any of the embodiments described herein can be any gas 50. In some embodiments, the gas 50 comprises carbon dioxide, hydrogen, air, and/or any other suitable gas 50. The circular conveyor 34 can comprise the first flotation system 30a and a second flotation system 30b having a second chamber 31b.

In some embodiments, a drone 2 can be configured to fluidly couple the first tank 41 to the first chamber 31a to transfer a first portion 50a of the gas 50 to the first chamber 31a to inflate the first chamber 31a, then drop the first flotation system 30a, then rotate the circular conveyor 34 relative to the first tank 41 to fluidly couple the first tank 41 to the second chamber 31b, then transfer a second portion 50b of the gas 50 to the second chamber 31b to inflate the second chamber 31b, and then drop the second flotation system 30b.

In some embodiments, program instructions 4 can be configured to fluidly couple the first tank 41 to the first chamber 31a to transfer a first portion 50a of the gas 50 to the first chamber 31a to inflate the first chamber 31a, then drop the first flotation system 30a, then rotate the circular conveyor 34 relative to the first tank 41 to fluidly couple the first tank 41 to the second chamber 31b, then transfer a second portion 50b of the gas 50 to the second chamber 31b to inflate the second chamber 31b, and then drop the second flotation system 30b.

In some embodiments, a drone 2 comprises an actuator 51 configured to fluidly couple the first tank 41 to the first chamber 31a.

In some embodiments, a drone 2 comprises one or more tanks configured to hold a gas 50. The gases used in some embodiments described herein can be any gas. In some embodiments, the gas comprises carbon dioxide, hydrogen, air, and/or any other suitable gas.

In some embodiments, a drone 2 comprises a first tank 41 and a second tank 42, a first channel 61 configured to fluidly couple the first tank 41 and the second tank 42, a first valve 45 configured to open and close the first channel 61, a pressure regulator 44 that fluidly couples the first tank 41 and the second tank 42, a gas outlet 65, a second channel 62 configured to fluidly couple the second tank 42 and the gas outlet 65, a second valve 46 configured to open and close the second channel 62, and program instructions 4. Program instructions 4 can be configured to inflate the first chamber 31a by opening the first valve 45 while the second valve 46 is closed to transfer a third portion 50c of the gas 50 to the second tank 42, then close the first valve 45, and then open the second valve 46 while the gas outlet 65 is fluidly coupled to the first chamber 31a. A pressure regulator 44 can be configured such that a second pressure inside the second tank 42 is lower than a first pressure inside the first tank 41.

In some embodiments, a drone 2 comprises a first tank 41 having a gas 50, a second tank 42, a first channel 61 configured to fluidly couple the first tank 41 and the second tank 42, a first valve 45 configured to open and close the first channel 61, a pressure regulator 44 that fluidly couples the first tank 41 and the second tank 42 via the first channel 61, a gas outlet 65, a second channel 62 configured to fluidly couple the second tank 42 and the gas outlet 65, a second valve configured to open and close the second channel 62, and program instructions 4.

Some embodiments comprise at least one memory 6 having program instructions 4 and at least one processor 5 configured to execute the program instructions 4.

In some embodiments, program instructions 4 are configured to inflate the first chamber 31a by opening the first valve 45 while the second valve 46 is closed to transfer a first portion 50a of the gas 50 to the second tank 42, then close the first valve 45, and then open the second valve 46 while the gas outlet 65 is fluidly coupled to the first chamber 31a to transfer the first portion 50a of the gas 50 to the first chamber 31a.

In some embodiments, a drone 2 comprises a second flotation system 30b having a second chamber 31b. Program instructions 4 can be configured to inflate the first chamber 31a and then inflate the second chamber 31b by fluidity coupling the gas outlet 65 to the second chamber 31b, opening the first valve 45 while the second valve 46 is closed to transfer a second portion 50b of the gas 50 to the second tank 42, and opening the second valve 46 while the first valve 45 is closed and while the gas outlet 65 is fluidly coupled to the second chamber 31b.

Figure 3:
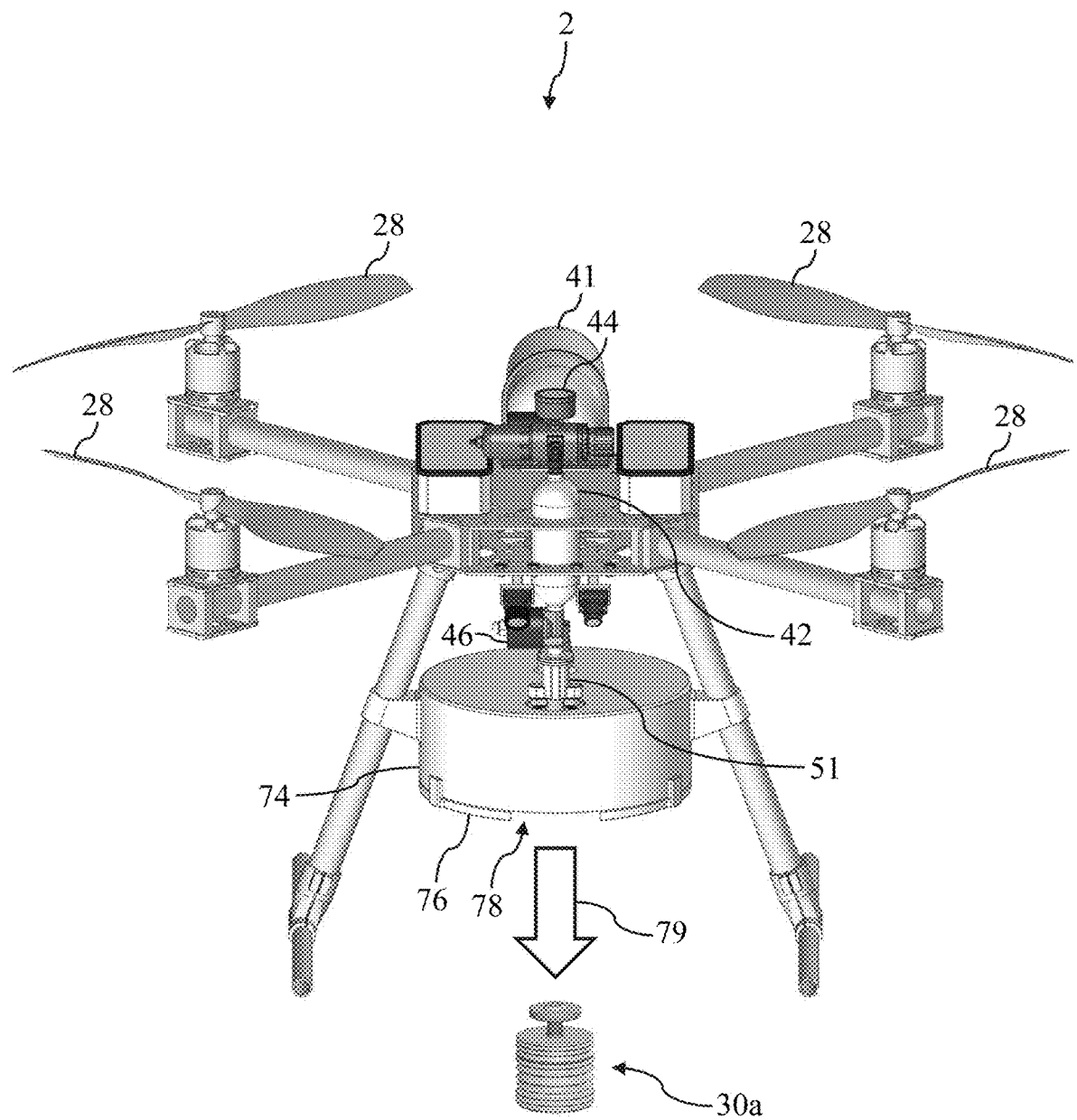
FIG. 3 illustrates a perspective view of a drone, according to some embodiments.
Figure 4:
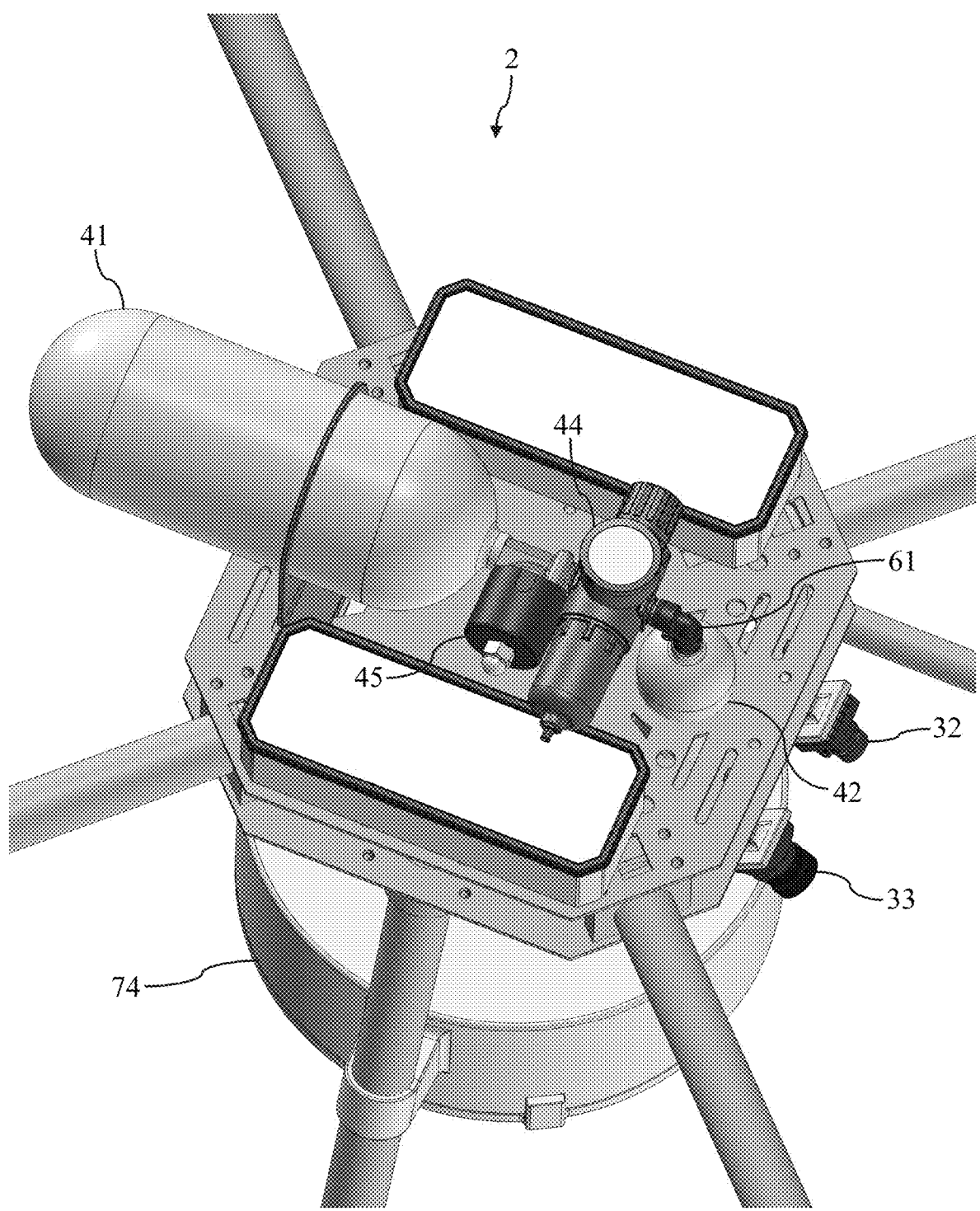
FIG. 4 illustrates a perspective view of portions of a drone, according to some embodiments.
Figure 5:
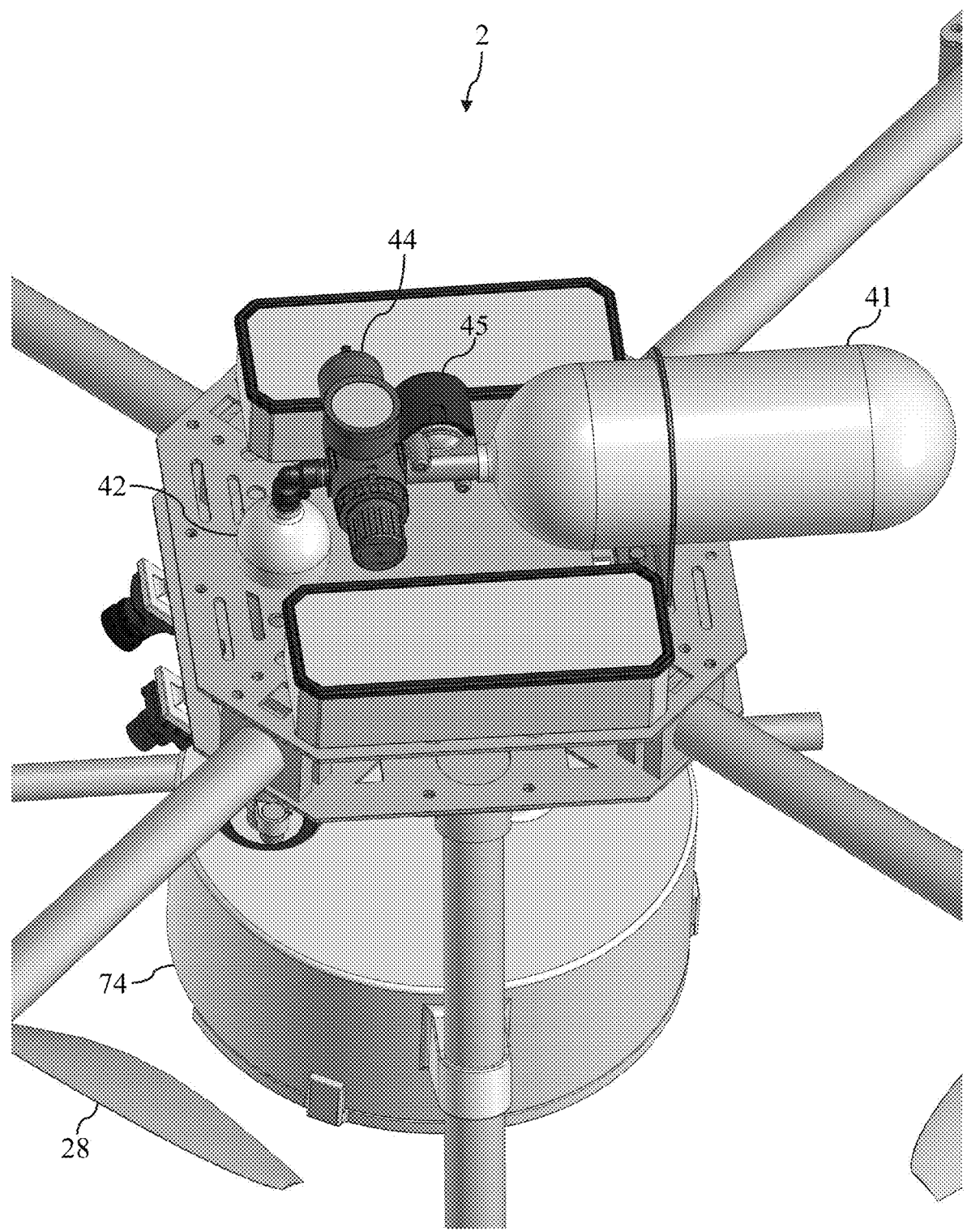
FIG. 5 illustrates a perspective view of portions of a drone, according to some embodiments.
Figure 6:
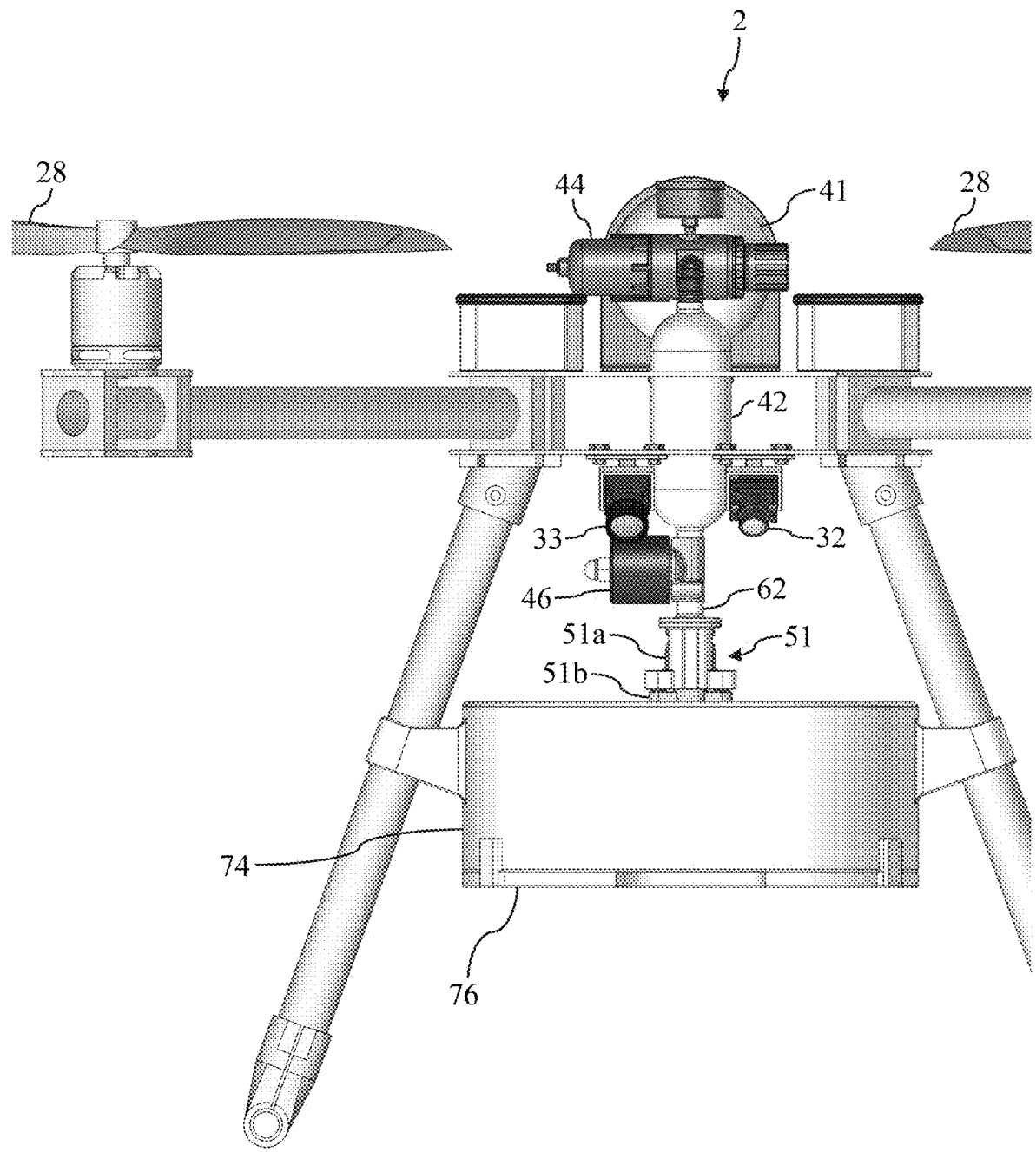
FIG. 6 illustrates a front view of portions of a drone, according to some embodiments.
Figure 7:
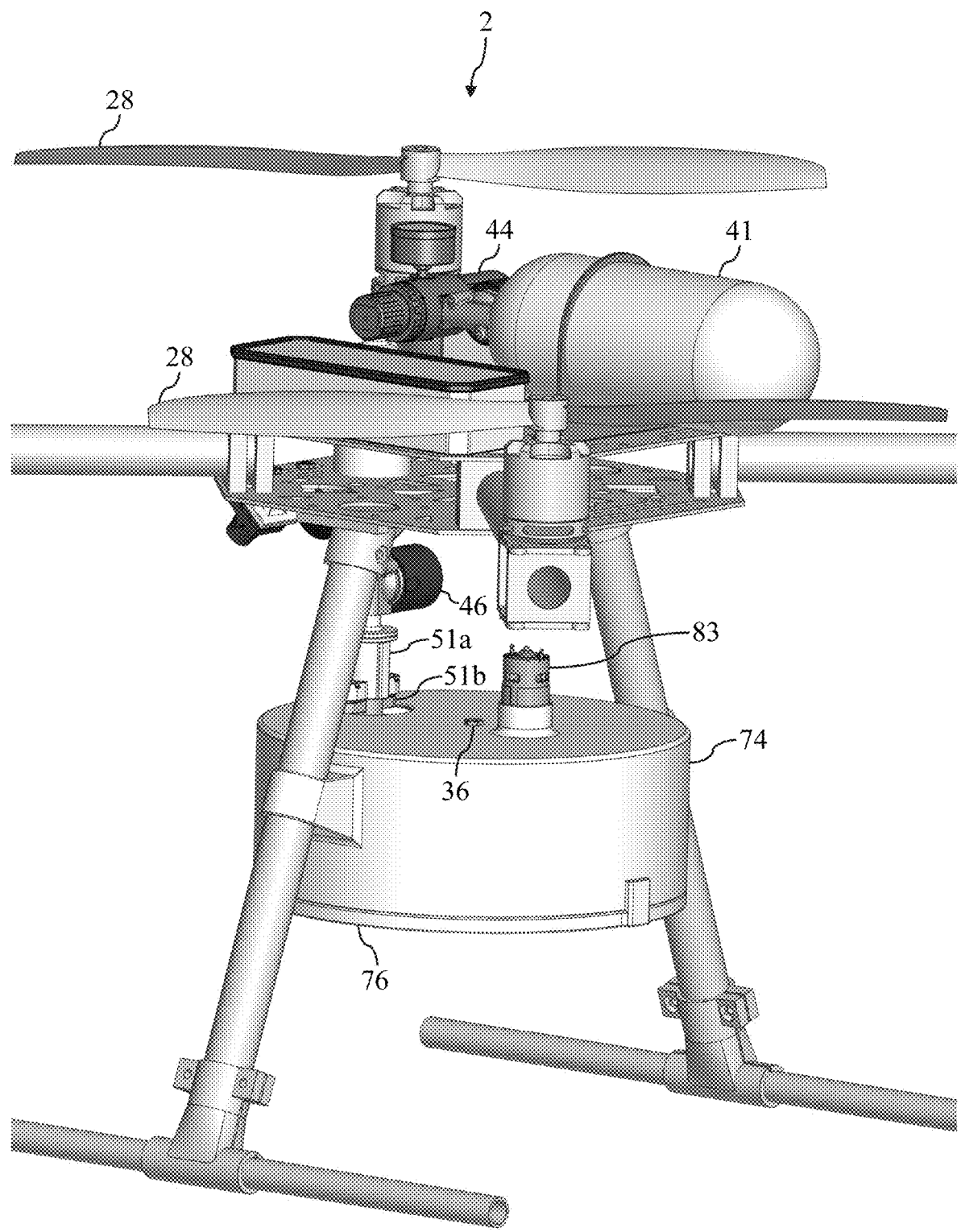
FIG. 7 illustrates a perspective view of portions of a drone, according to some embodiments.

As illustrated in FIG. 3, a drone 2 can include a first housing 74 that can include a lid 76 that covers a bottom of the first housing 74. The lid 76 and/or the first housing 74 can include an opening 78 that enables flotation systems 30a, 30b 30c, 30d, 30e to fall downward 79 away from the drone 2 toward the water 26 located below the drone 2.

The flotation system 30a as illustrated in FIG. 3 is not yet inflated, but in some embodiments, the flotation system 30a would be inflated prior to drone 2 and/or program instructions 4 decoupling the flotation system 30a from the drone 2. In some embodiments, a cavity that holds a flotation system 30a is so small that inflating the flotation system 30a causes the flotation system 30a to exit the cavity 81 (because the expanding size of the chamber 31a pushes the flotation system 30a out of the cavity 81). Even after the flotation system 30a exits the cavity 81, the tube 69 enables the drone 2 to continue to inflate the flotation system 30a.

In some embodiments, a drone 2 comprises a second flotation system 30b having a second chamber 31b configured to be inflated with a gas 50, a first housing 74 coupled to the at least one propeller 28, and a second housing 75 rotatably coupled to the first housing 74. The second housing 75 can comprise a first cavity 81 and a second cavity 82. The first flotation system 30a can be located at least partially in the first cavity 81. The second flotation system 30b can be located at least partially in the second cavity 82.

In some embodiments, a drone 2 comprises a first tank 41 having a gas 50. A drone 2 can be configured to fluidly couple the first tank 41 to the first chamber 31a to inflate the first chamber 31a and then rotate the second housing 75 relative to the first housing 74 to fluidly couple the first tank 41 to the second chamber 31b to inflate the second chamber 31b.

In some embodiments, program instructions 4 are configured to fluidly couple the first tank to the first chamber 31a to inflate the first chamber 31a and then rotate the second housing 75 relative to the first housing 74 to fluidly couple the first tank 41 to the second chamber 31b to inflate the second chamber 31b.

In some embodiments, a drone 2 comprises a first tank 41 having a gas 50. A drone 2 can be configured to inflate the first chamber 31a by fluidly coupling the first tank 41 to the first chamber 31a and then inflate the second chamber 31b by rotating the second housing 75 relative to the first housing 74 and then fluidly coupling the first tank 41 to the second chamber 31b.

In some embodiments, program instructions 4 are configured to inflate the first chamber 31a by fluidly coupling the first tank 41 to the first chamber 31a and then inflate the second chamber 31b by rotating the second housing 75 relative to the first housing 74 and then fluidly coupling the first tank 41 to the second chamber 31b.

In some embodiments, a drone 2 comprises a first tank 41 having a gas 50, a first motor 83 configured to rotate the second housing 75 relative to the first housing 74, and a linear actuator 51. The linear actuator 51 can comprise a first portion 51a and a second portion 51b configured to move away from the first portion 51a.

In some embodiments, the second portion 51b moves away from the first portion 51a in a first direction 99. (The first direction 99 is illustrated by an arrow in FIG. 10.) In some embodiments, the second portion 51b rotates away from the first portion 51a.

In some embodiments, the linear actuator 51 is configured to move the second portion 51b relative to the first portion 51a to fluidly couple the first tank 41 to the first chamber 31a to inflate the first chamber 31a, the first motor 83 is configured to rotate the second housing 75 relative to the first housing 74 to enable fluidly coupling the first tank 41 to the second chamber 31b, and the linear actuator 51 is configured to move the second portion 51b relative to the first portion 51a to fluidly couple the first tank 41 to the second chamber 31b to inflate the second chamber 31b.

In some embodiments, the linear actuator 51 and the program instructions 4 are configured to move the second portion 51b relative to the first portion 51a to fluidly couple the first tank 41 to the first chamber 31a to inflate the first chamber 31a, the first motor 83 and the program instructions 4 are configured to rotate the second housing 75 relative to the first housing 74 to enable fluidly coupling the first tank 41 to the second chamber 31b, and the linear actuator 51 and the program instructions 4 are configured to move the second portion 51b relative to the first portion 51a to fluidly couple the first tank 41 to the second chamber 31b to inflate the second chamber 31b.

In some embodiments, a drone 2 comprises program instructions 4 and a first tank 41 having a gas 50. Program instructions 4 can be configured to fluidly couple the first tank 41 to the first chamber 31a to transfer a first portion 50a of the gas 50 to the first chamber 31*a* to inflate the first chamber 31*a*, then drop the first flotation system 30*a*, then rotate the second housing 75 relative to the first housing 74 to fluidly couple the first tank 41 to the second chamber 31*b*, then transfer a second portion 50*b* of the gas 50 to the second chamber 31*b* to inflate the second chamber 31*b*, and then drop the second flotation system 30*b*.

In some embodiments, a drone 2 comprises a gas outlet 65 configured to be fluidly coupled with the first tank 41, a first motor 83 configured to rotate the second housing 75 relative to the first housing 74, and a linear actuator 51. The linear actuator 51 can comprise a first portion 51*a* and a second portion 51*b* configured to move away from the first portion 51*a*. Program instructions 4 can be configured to move the second portion 51*b* away from the first portion 51*a* of the linear actuator 51 to fluidly couple the gas outlet 65 to the first chamber 31*a* to inflate the first chamber 31*a*, then rotate the second housing 75 relative to the first housing 74 to bring the second chamber 31*b* closer to the gas outlet 65, and then move the second portion 51*b* away from the first portion 51*a* of the linear actuator 51 to fluidly couple the gas outlet 65 to the second chamber 31*b* to inflate the second chamber 31*b*.

In some embodiments, a drone 2 comprises a first electromagnet 84. The linear actuator 51 can be configured such that supplying a first electric current 86 through the first electromagnet 84 pushes the second portion 51*b* away from the first portion 51*a*.

In some embodiments, a drone 2 comprises a first housing 74 coupled to the at least one propeller 28 and a second housing 75 coupled to the first housing 74. The second housing 75 can comprise a first cavity 81. The first flotation system 30*a* can comprise a first bladder 90 having the first chamber 31*a*. The first bladder 90 can comprise an accordion-shaped portion 91 configured to expand when inflated. The accordion-shaped portion 91 can be located at least partially in the first cavity 81.

In some embodiments, a drone 2 comprises a membrane 92. The first cavity 81 can comprise a distal end portion 93 at least partially blocked by the membrane 92 such that the membrane 92 is configured to prevent the first flotation system 30*a* from falling out of the first cavity 81 and the membrane 92 is configured to be ruptured when the accordion-shaped portion 91 is inflated to enable the first flotation system 30*a* to exit the distal end portion 93.

In some embodiments, a drone 2 comprises a first housing 74 coupled to the at least one propeller 28 and a second housing 75 coupled to the first housing 74. The second housing 75 can comprise a first cavity 81. At least a portion 94 of the first chamber 31*a* can be located in the first cavity 81.

In some embodiments, a first flotation system 30*a* comprises an inlet 67 coupled to the first cavity 81 and a tube 69 having a lumen 71 70 that fluidly couples the first chamber 31*a* and the inlet 67. The drone 2 can be configured to inflate the first chamber 31*a* such that the first chamber 31*a* exits the first cavity 81 while the inlet 67 remains coupled to the first cavity 81 and while the tube 69 couples the inlet 67 to the first chamber 31*a*.

In some embodiments, a first flotation system 30*a* comprises a first bladder 90 having the first chamber 31*a*. The tube 69 can be at least one meter long and/or at least three meters long. Program instructions 4 can be configured to drag the first bladder 90 on a surface 29 of a body 27 of water 26 while the inlet 67 is coupled to the first cavity 81 such that the tube 69 pulls the first bladder 90 along the surface 29 of the body 27 of the water 26.

In some embodiments, a drone 2 comprises a first tank (e.g., tank 41 or tank 42) having a gas 50, program instructions 4, and a linear actuator 51. The linear actuator 51 can comprise a first portion 51*a* and a second portion 51*b*. The second portion 51*b* of the linear actuator 51 can be configured to move away from the first portion 51*a* of the linear actuator 51. Program instructions 4 can be configured to move the second portion 51*b* away from the first portion 51*a* a first distance 95 to fluidly couple the first tank 41 to the inlet 67 to cause the first chamber 31*a* to exit the first cavity 81 by inflating the first chamber 31*a*, and the program instructions 4 can be configured to move the second portion 51*b* away from the first portion 51*a* a second distance 96 that is greater than the first distance 95 to decouple the first flotation system 30*a* from the drone 2.

Figure 15:
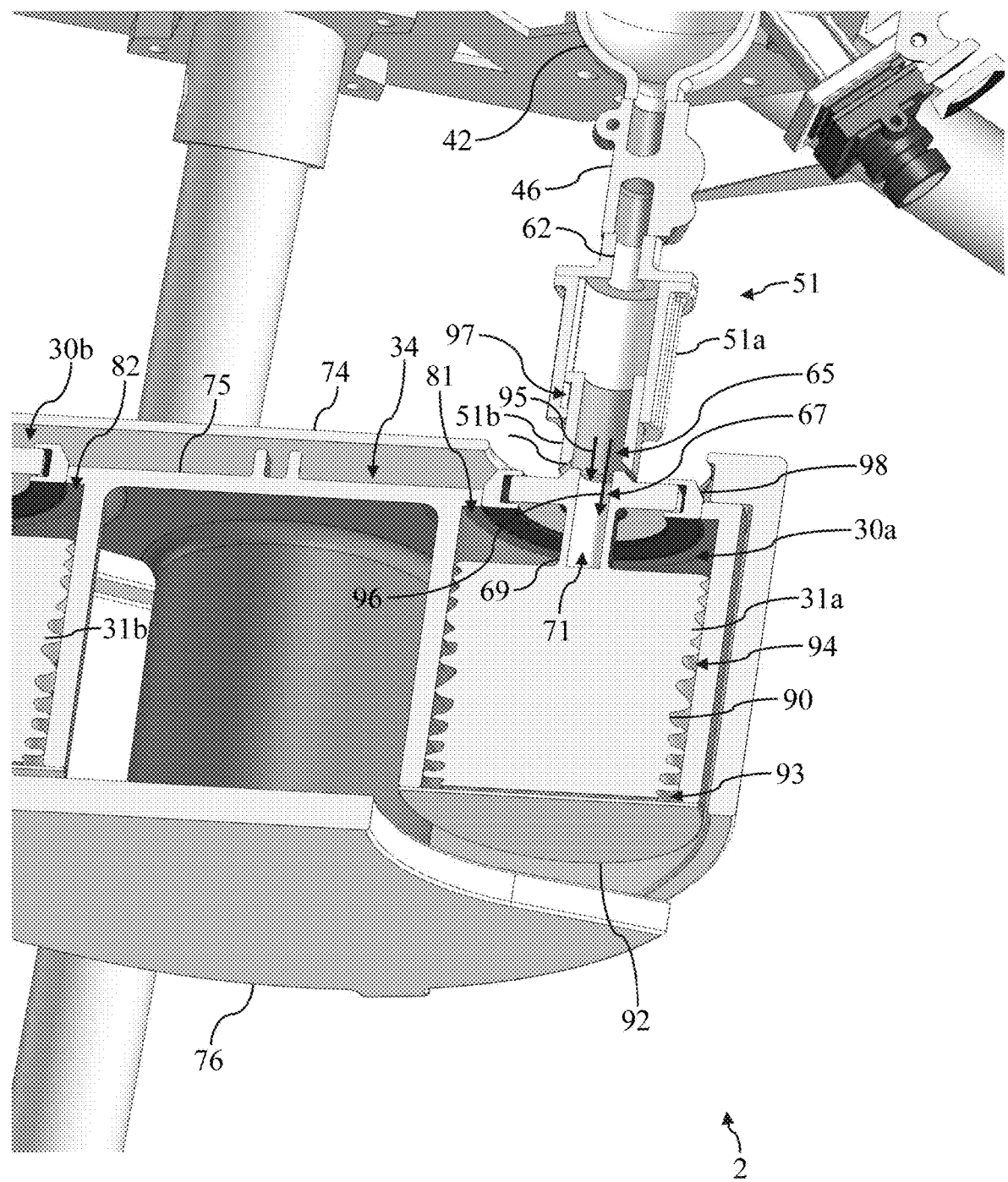

FIG. 15 illustrates a linear actuator 51 that includes a first portion 51*a* and a second portion 51*b*. The second portion 51*b* of the linear actuator 51 can be configured to move away from the first portion 51*a* of the linear actuator 51. As illustrated in FIG. 15, the second portion 51*b* has moved distally away from the first portion 51*a* to enable the linear actuator 51 to create a seal with an inlet 67 of the first flotation system 30*a* in order to facilitate inflating a chamber 31*a* of the first flotation system 30*a*. Inflating the chamber 31*a* creates a personal flotation device ("PFD") that is shaped like a long cylinder (similar to a "pool noodle") and that can be dropped downward from the drone 2. A person 3 who is in danger of drowning can then use the PFD to avoid drowning.

FIG. 15 illustrates an open area 97 that indicates that the second portion 51*b* can continue to move away from the first portion 51*a*. This additional movement ability enables the drone 2 to dislodge the first flotation system 30*a* from the second housing 75. A disk 98 (which can include a rubber seal as shown in FIG. 15 but not shown in FIG. 20) is compression fit with an orifice of the second housing 75. The linear actuator 51 pressing downward on the disk 98 dislodges the disk 98 and thereby causes the first flotation system 30*a* to fall downward (out of the drone 2). In some embodiments, the first flotation system 30*a* is inflated prior to the linear actuator 51 dislodging the first flotation system 30*a* from the drone 2 (to drop the first flotation system 30*a* to a drowning victim 3*a*).

In some embodiments, a drone 2 comprises a first cavity 81, a first tank (e.g., tank 41 or tank 42) having a gas 50, an actuator 51, and an inlet 67 fluidly coupled to the first chamber 31*a*. The first flotation system 30*a* can be located at least partially in the first cavity 81. The actuator can comprise a first portion 51*a* and a second portion 51*b*. The second portion 51*b* can configured to move away from the first portion 51*a* to fluidly couple the first tank 41 to the inlet 67 to transfer a first portion 50*a* of the gas 50 from the first tank 41 to the first chamber 31*a* to inflate the first flotation system 30*a*.

In some embodiments, a drone 2 comprises a first electromagnet 84. The actuator 51 can be configured such that supplying a first electric current 86 through the first electromagnet 84 pushes the second portion 51*b* away from the first portion 51*a* to fluidly couple the first tank 41 to the inlet 67.

In some embodiments, a drone 2 comprises a first electromagnet 84 and a second electromagnet 85. The actuator 51 can be a linear actuator 51 configured to push the second portion 51*b* away from the first portion 51*a* in a first direction 99. The first electromagnet 84 and the second electromagnet 85 can be located radially outward 101 from the first direction 99. The first electromagnet 84 and the second electromagnet 85 can be configured such that supplying a first electric current 86 through the first electromagnet 84 and supplying a second electric current 87 through the second electromagnet 85 causes the first electromagnet 84 to repel the second electromagnet 85 to push the second portion 51*b* away from the first portion 51*a* to fluidly couple the first tank 41 to the inlet 67.

In some embodiments, a drone 2 comprises a housing 74 coupled to the at least one propeller 28, a tube 69 that is at least one meter long and that has a lumen 71 that fluidly couples the first chamber 31*a* and the inlet 67, and a disk 98 that removably couples the inlet 67 to the housing 74.

In some embodiments, a drone 2 is configured such that supplying the first electric current 86 through the first electromagnet 84 and supplying the second electric current 87 through the second electromagnet 85 fluidly couples the first tank 41 to the inlet 67 when a channel 61, 62 between the first tank 41 and the inlet 67 is open. In some embodiments, a drone 2 is configured such that inflating the first chamber 31*a* causes the first chamber 31*a* to exit the first cavity 81 while the tube 69 couples the first chamber 31*a* to the disk 98 while the disk 98 couples the inlet 67 to the housing 74. In some embodiments, a drone 2 is configured such that supplying at least one of a third electric current 88 through the first electromagnet 84 and a fourth electric current 89 through the second electromagnet 85 dislodges the disk 98 (to force the disk 98 out of a secure or settled position) such that the inlet 67 is uncoupled from the housing 74 to enable the first flotation system 30*a* to fall away from the drone 2. The third electric current 88 can be greater than the first electric current 86. The fourth electric current 89 can be greater than the second electric current.

Interpretation

To reduce unnecessary redundancy, not every element or feature is described in the context of every embodiment, but all elements and features described in the context of any embodiment herein and/or incorporated by reference can be combined with any elements and/or features described in the context of any other embodiments.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The term "app", as used in this disclosure, refers to both native apps and mobile cloud apps (and Web apps). Native apps are installed directly on remote computing devices, whereby developers create separate app versions for each type of remote computing device (e.g., iPhone devices and Android devices). Native apps may be stored on the remote computing device out of the box, or the native apps can be downloaded from a public or private app store and installed on the remote computing device.

Data associated with native apps can be stored on the remote computing device and/or can be stored remotely and accessed by the native app. Internet connectivity may be used by some instances of apps. Other instances of apps may not use Internet connectivity. In some embodiments, apps can function without Internet connectivity.

Mobile cloud apps are very similar to Web-based apps. The main similarity is that both mobile cloud apps and Web apps run on servers external to the remote computing device and may require the use of a browser on the remote computing device to display and then use the app user interface (UI). Mobile cloud apps can be native apps rebuilt to run in the mobile cloud; custom apps developed for mobile devices; or third-party apps downloaded to the cloud from external sources. Some organizations offer both a native and mobile cloud versions of their applications. In short, the term "app" refers to both native apps and mobile cloud apps.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The following is claimed:

1. A drone configured to help a drowning victim, the drone comprising:
   at least one propeller configured to enable the drone to fly;
   a first flotation system comprising a first chamber; and
   a first tank having a gas, a second tank, a first channel configured to fluidly couple the first tank and the second tank, a first valve configured to open and close the first channel, a pressure regulator that fluidly couples the first tank and the second tank via the first channel, a gas outlet, a second channel configured to fluidly couple the second tank and the gas outlet, a second valve configured to open and close the second channel, and program instructions configured to inflate the first chamber by opening the first valve while the second valve is closed to transfer a first portion of the gas to the second tank, then close the first valve, and then open the second valve while the gas outlet is fluidly coupled to the first chamber to transfer the first portion of the gas to the first chamber.

2. The drone of claim 1, further comprising an actuator configured to fluidly couple the second tank to the first chamber.

3. The drone of claim 1, further comprising a second flotation system having a second chamber, wherein the program instructions are configured to inflate the first chamber and then inflate the second chamber by fluidity coupling the gas outlet to the second chamber, opening the first valve while the second valve is closed to transfer a second portion of the gas to the second tank, and opening the second valve while the first valve is closed and while the gas outlet is fluidly coupled to the second chamber.

4. A drone configured to help a drowning victim, the drone comprising:
   at least one propeller configured to enable the drone to fly;
   a first flotation system comprising a first chamber;
   a second flotation system having a second chamber;
   a first housing coupled to the at least one propeller; and
   a second housing rotatably coupled to the first housing, wherein the second housing comprises a first cavity and a second cavity, the first flotation system is located at least partially in the first cavity, and the second flotation system is located at least partially in the second cavity.

5. The drone of claim 4, further comprising a circular conveyor and a first tank having a gas, wherein the drone is configured to fluidly couple the first tank to the first chamber to transfer a first portion of the gas to the first chamber to inflate the first chamber, then drop the first flotation system, then rotate the circular conveyor relative to the first tank to fluidly couple the first tank to the second chamber, then transfer a second portion of the gas to the second chamber to inflate the second chamber, and then drop the second flotation system.

6. The drone of claim 4, further comprising a first tank having a gas, wherein the drone is configured to inflate the first chamber by fluidly coupling the first tank to the first chamber and then inflate the second chamber by rotating the second housing relative to the first housing and then fluidly coupling the first tank to the second chamber.

7. The drone of claim 4, further comprising a first tank having a gas, a first motor configured to rotate the second housing relative to the first housing, and a linear actuator, wherein the linear actuator comprises a first portion and a second portion configured to move away from the first portion of the linear actuator, and
   wherein the linear actuator is configured to move the second portion of the linear actuator relative to the first portion of the linear actuator to fluidly couple the first tank to the first chamber to inflate the first chamber, the first motor is configured to rotate the second housing relative to the first housing to enable fluidly coupling the first tank to the second chamber, and the linear actuator is configured to move the second portion of the linear actuator relative to the first portion of the linear actuator to fluidly couple the first tank to the second chamber to inflate the second chamber.

8. The drone of claim 4, further comprising program instructions and a first tank having a gas, wherein the program instructions are configured to fluidly couple the first tank to the first chamber to transfer a first portion of the gas to the first chamber to inflate the first chamber, then drop the first flotation system, then rotate the second housing relative to the first housing to fluidly couple the first tank to the second chamber, then transfer a second portion of the gas to the second chamber to inflate the second chamber, and then drop the second flotation system.

9. The drone of claim 8, further comprising a gas outlet configured to be fluidly coupled with the first tank, a first motor configured to rotate the second housing relative to the first housing, and a linear actuator, wherein the linear actuator comprises a first portion and a second portion configured to move away from the first portion of the linear actuator, and wherein the program instructions are configured to move the second portion of the linear actuator away from the first portion of the linear actuator to fluidly couple the gas outlet to the first chamber to inflate the first chamber, then rotate the second housing relative to the first housing to bring the second chamber closer to the gas outlet, and then move the second portion of the linear actuator away from the first portion of the linear actuator to fluidly couple the gas outlet to the second chamber to inflate the second chamber.

10. The drone of claim 9, further comprising a first electromagnet, wherein the linear actuator is configured such that supplying a first electric current through the first electromagnet pushes the second portion of the linear actuator away from the first portion of the linear actuator.

11. The drone of claim 4, wherein the first flotation system comprises a first bladder having the first chamber, the first bladder comprises an accordion-shaped portion configured to expand when inflated, and the accordion-shaped portion is located at least partially in the first cavity.

12. A drone configured to help a drowning victim, the drone comprising:
    at least one propeller configured to enable the drone to fly;
    a first flotation system comprising a first chamber;
    a first housing coupled to the at least one propeller; and
    a second housing coupled to the first housing, wherein the second housing comprises a first cavity, and at least a portion of the first chamber is located in the first cavity,
    wherein the first flotation system comprises an inlet coupled to the first cavity and a tube having a lumen that fluidly couples the first chamber and the inlet, and the drone is configured to inflate the first chamber such that the first chamber exits the first cavity while the inlet remains coupled to the first cavity and while the tube couples the inlet to the first chamber.

13. The drone of claim 12, further comprising a first tank having a gas, a second tank, a first channel configured to fluidly couple the first tank and the second tank, a first valve configured to open and close the first channel, a pressure regulator that fluidly couples the first tank and the second tank, a gas outlet, a second channel configured to fluidly couple the second tank and the gas outlet, a second valve configured to open and close the second channel, and program instructions configured to inflate the first chamber by opening the first valve while the second valve is closed to transfer a portion of the gas to the second tank, then close the first valve, and then open the second valve while the gas outlet is fluidly coupled to the first chamber.

14. The drone of claim 12, wherein the first flotation system comprises a first bladder having the first chamber, the first bladder comprises an accordion-shaped portion configured to expand when inflated, and the accordion-shaped portion is located at least partially in the first cavity.

15. The drone of claim 14, further comprising a membrane, wherein the first cavity comprises a distal end portion at least partially blocked by the membrane such that the membrane is configured to prevent the first flotation system from falling out of the first cavity and the membrane is configured to be ruptured when the accordion-shaped portion is inflated to enable the first flotation system to exit the distal end portion.

16. The drone of claim 12, wherein the first flotation system comprises a first bladder having the first chamber, the tube is at least one meter long, and the drone comprises program instructions configured to drag the first bladder on a surface of a body of water while the inlet is coupled to the first cavity such that the tube pulls the first bladder along the surface of the body of the water.

17. The drone of claim 12, further comprising a first tank having a gas, program instructions, and a linear actuator, wherein the linear actuator comprises a first portion and a second portion configured to move away from the first portion of the linear actuator, and wherein the program instructions are configured to move the second portion of the linear actuator away from the first portion of the linear actuator a first distance to fluidly couple the first tank to the inlet to cause the first chamber to exit the first cavity by inflating the first chamber and the program instructions are configured to move the second portion of the linear actuator away from the first portion of the linear actuator a second distance that is greater than the first distance to decouple the first flotation system from the drone.

18. A drone configured to help a drowning victim, the drone comprising:
    at least one propeller configured to enable the drone to fly;
    a first flotation system comprising a first chamber;
    a first cavity;
    a first tank having a gas;
    an actuator; and
    an inlet fluidly coupled to the first chamber, wherein the first flotation system is located at least partially in the first cavity, and the actuator comprises a first portion and a second portion configured to move away from the first portion of the actuator to fluidly couple the first tank to the inlet to transfer a first portion of the gas from the first tank to the first chamber to inflate the first flotation system.

19. The drone of claim 18, further comprising a first electromagnet, wherein the actuator is configured such that supplying a first electric current through the first electromagnet pushes the second portion of the actuator away from the first portion of the actuator to fluidly couple the first tank to the inlet.

20. The drone of claim 18, further comprising a first electromagnet and a second electromagnet, wherein the actuator is a linear actuator configured to push the second portion of the linear actuator away from the first portion of the linear actuator in a first direction, the first electromagnet and the second electromagnet are located radially outward from the first direction, and the first electromagnet and the second electromagnet are configured such that supplying a first electric current through the first electromagnet and supplying a second electric current through the second electromagnet causes the first electromagnet to repel the second electromagnet to push the second portion of the linear actuator away from the first portion of the linear actuator to fluidly couple the first tank to the inlet.

21. The drone of claim 20, further comprising a housing coupled to the at least one propeller, a tube that is at least one meter long and that has a lumen that fluidly couples the first chamber and the inlet, and a disk that removably couples the inlet to the housing, wherein the drone is configured such that supplying the first electric current through the first electromagnet and supplying the second electric current through the second electromagnet fluidly couples the first tank to the inlet when a channel between the first tank and the inlet is open, inflating the first chamber causes the first chamber to exit the first cavity while the tube couples the first chamber to the disk while the disk couples the inlet to the housing, and supplying at least one of a third electric current through the first electromagnet and a fourth electric current through the second electromagnet dislodges the disk such that the inlet is uncoupled from the housing to enable the first flotation system to fall away from the drone, wherein the third electric current is greater than the first electric current and the fourth electric current is greater than the second electric current.

\* \* \* \* \*